US012700224B2

(12) United States Patent     (10) Patent No.:     US 12,700,224 B2
Guo                              (45) Date of Patent:          Aug. 4, 2026

(54) METHOD, COMPUTER DEVICE, AND STORAGE MEDIUM, FOR FEATURE FUSION MODEL TRAINING AND SAMPLE RETRIEVAL

(71) Applicant: TENCENT TECHNOLOGY (SHENZHEN) COMPANY LIMITED, Shenzhen (CN)

(72) Inventor: Hui Guo, Shenzhen (CN)

(73) Assignee: TENCENT TECHNOLOGY (SHENZHEN) COMPANY LIMITED, Shenzhen (CN)

( * ) Notice:    Subject to any disclaimer, the term of this patent is extended or adjusted under 35 U.S.C. 154(b) by 356 days.

(21) Appl. No.: 18/450,463

(22) Filed:    Aug. 16, 2023

(65)           Prior Publication Data

US 2023/0401833 A1      Dec. 14, 2023

Related U.S. Application Data

(63) Continuation of application No. PCT/CN2022/131477, filed on Nov. 11, 2022.

(30)      Foreign Application Priority Data

Jan. 24, 2022    (CN) .......................... 202210081438.1

(51) Int. Cl.
*G06V 10/80*        (2022.01)
*G06V 10/764*       (2022.01)
*G06V 10/774*       (2022.01)
(52) U.S. Cl.
CPC ............. *G06V 10/80* (2022.01); *G06V 10/764* (2022.01); *G06V 10/774* (2022.01)
(58) Field of Classification Search
CPC ....... G06F 16/532; G06F 18/253; G06N 3/04; G06V 10/80
See application file for complete search history.

(56)           References Cited

U.S. PATENT DOCUMENTS 9,965,705  B2 *   5/2018   Chen ......................... G06N 5/04
11,423,304 B2 *   8/2022   Liu ........................... G06N 3/09
                  (Continued)

FOREIGN PATENT DOCUMENTS

CN      111680541 A    9/2020
CN      113157900 A    7/2021
                 (Continued)

OTHER PUBLICATIONS

Supervised_Contrastive_Learning_Based_on_Fusion_of_Global_ and_Local_Features_for_Remote_Sensing_Image_Retrieval, Huang et al., 2023.*

(Continued)

*Primary Examiner* — Vu Le
(74) *Attorney, Agent, or Firm* — Anova Law Group, PLLC

(57)           ABSTRACT

A method for feature fusion model training and sample retrieval includes: inputting training sample into an initial feature fusion model to obtain a training semantic feature and a training global feature, performing classification and recognition based on the training semantic feature to obtain an initial training category, splicing the training semantic feature and the training global feature to obtain a spliced training feature, performing autocorrelation feature calculation based on the spliced training feature to obtain an autocorrelation feature, performing self-attention weight calculation based on the autocorrelation feature to obtain a self-attention weight, and adjusting the spliced training feature through the self-attention weight to obtain a fused training feature; and updating the initial feature fusion model based on the training global feature, the training semantic feature, the fused training feature, the initial training category, and a training sample category label, and performing a loop iteration to obtain a target fusion model.

20 Claims, 16 Drawing Sheets

(56) References Cited

U.S. PATENT DOCUMENTS

| | | | | | |
|---|---|---|---|---|---|
| 11,768,876 | B2 * | 9/2023 | Qin | ..................... | G06V 10/806 |
| | | | | | 382/103 |
| 11,941,522 | B2 * | 3/2024 | Zhang | .................... | G06F 16/29 |
| 12,494,195 | B2 * | 12/2025 | Tu | ......................... | G10L 15/187 |
| 2017/0124432 | A1 * | 5/2017 | Chen | ........................ | G06N 5/04 |
| 2021/0216862 | A1 * | 7/2021 | Liu | ......................... | G06N 3/09 |
| 2021/0264190 | A1 * | 8/2021 | Qin | .................... | G06F 16/3329 |
| 2023/0222781 | A1 * | 7/2023 | Kim | .................... | G06V 10/806 |
| | | | | | 382/156 |

FOREIGN PATENT DOCUMENTS

| | | | |
|---|---|---|---|
| CN | 113177895 | A | 7/2021 |
| CN | 113655479 | A | 11/2021 |
| CN | 113706550 | A | 11/2021 |
| CN | 113822284 | A | 12/2021 |
| JP | 2012014270 | A | 1/2012 |

OTHER PUBLICATIONS

The World Intellectual Property Organization (WIPO) International Search Report for PCT/CN2022/131477 Jan. 20, 2023 12 Pages (including translation).
Taha A, et al., "Boosting Standard Classification Architectures Through a Ranking Regularizer", IEEE, 2020.

\* cited by examiner

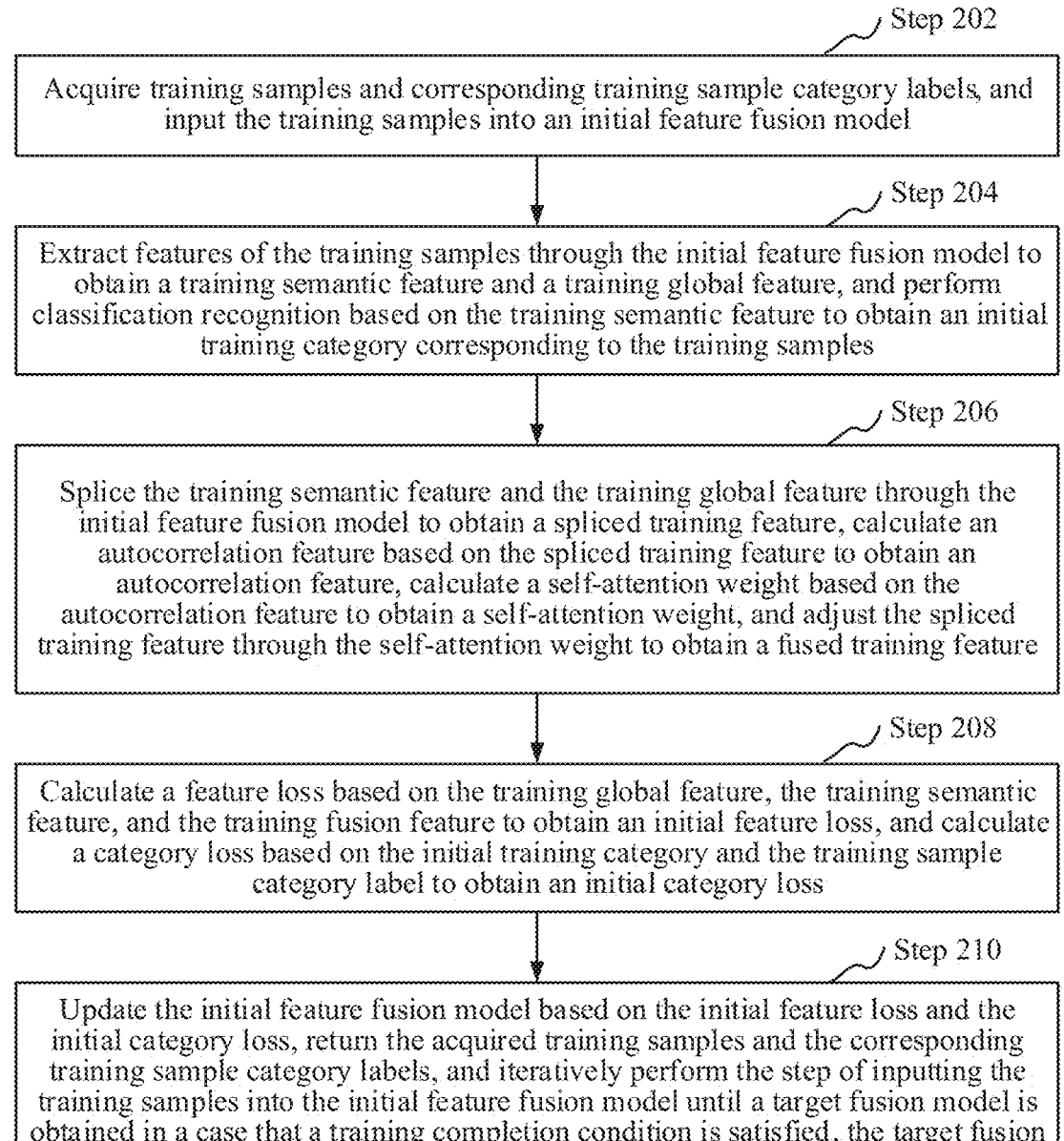

Step 202

Acquire training samples and corresponding training sample category labels, and input the training samples into an initial feature fusion model Step 204

Extract features of the training samples through the initial feature fusion model to obtain a training semantic feature and a training global feature, and perform classification recognition based on the training semantic feature to obtain an initial training category corresponding to the training samples Step 206

Splice the training semantic feature and the training global feature through the initial feature fusion model to obtain a spliced training feature, calculate an autocorrelation feature based on the spliced training feature to obtain an autocorrelation feature, calculate a self-attention weight based on the autocorrelation feature to obtain a self-attention weight, and adjust the spliced training feature through the self-attention weight to obtain a fused training feature Step 208

Calculate a feature loss based on the training global feature, the training semantic feature, and the training fusion feature to obtain an initial feature loss, and calculate a category loss based on the initial training category and the training sample category label to obtain an initial category loss Step 210

Update the initial feature fusion model based on the initial feature loss and the initial category loss, return the acquired training samples and the corresponding training sample category labels, and iteratively perform the step of inputting the training samples into the initial feature fusion model until a target fusion model is obtained in a case that a training completion condition is satisfied, the target fusion model being configured to fuse the semantic feature and the global feature extracted from input data to obtain a target fusion feature, and use the target fusion feature as an index of the input data

FIG. 2

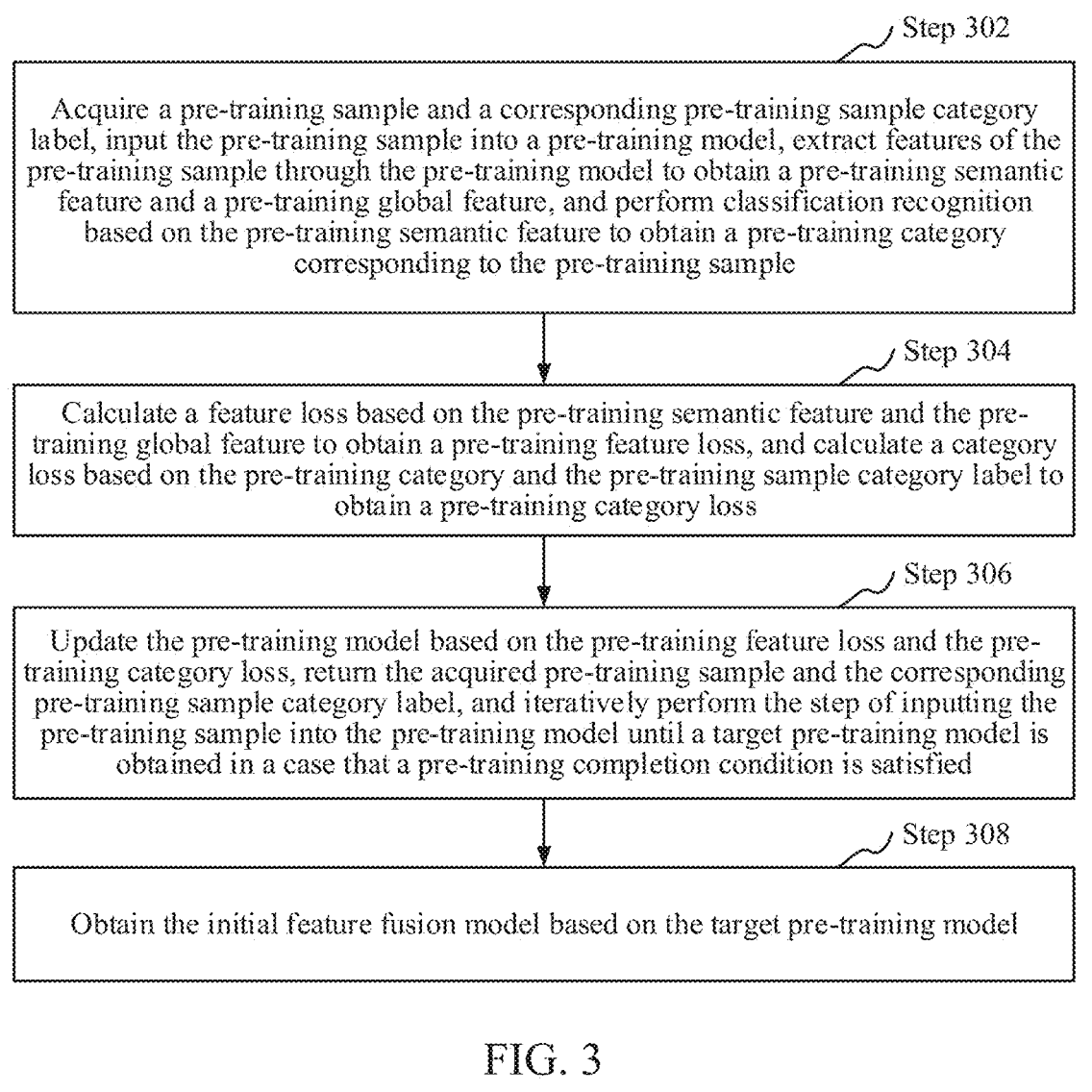

Step 302

Acquire a pre-training sample and a corresponding pre-training sample category label, input the pre-training sample into a pre-training model, extract features of the pre-training sample through the pre-training model to obtain a pre-training semantic feature and a pre-training global feature, and perform classification recognition based on the pre-training semantic feature to obtain a pre-training category corresponding to the pre-training sample Step 304

Calculate a feature loss based on the pre-training semantic feature and the pre-training global feature to obtain a pre-training feature loss, and calculate a category loss based on the pre-training category and the pre-training sample category label to obtain a pre-training category loss Step 306

Update the pre-training model based on the pre-training feature loss and the pre-training category loss, return the acquired pre-training sample and the corresponding pre-training sample category label, and iteratively perform the step of inputting the pre-training sample into the pre-training model until a target pre-training model is obtained in a case that a pre-training completion condition is satisfied Step 308

Obtain the initial feature fusion model based on the target pre-training model

FIG. 3

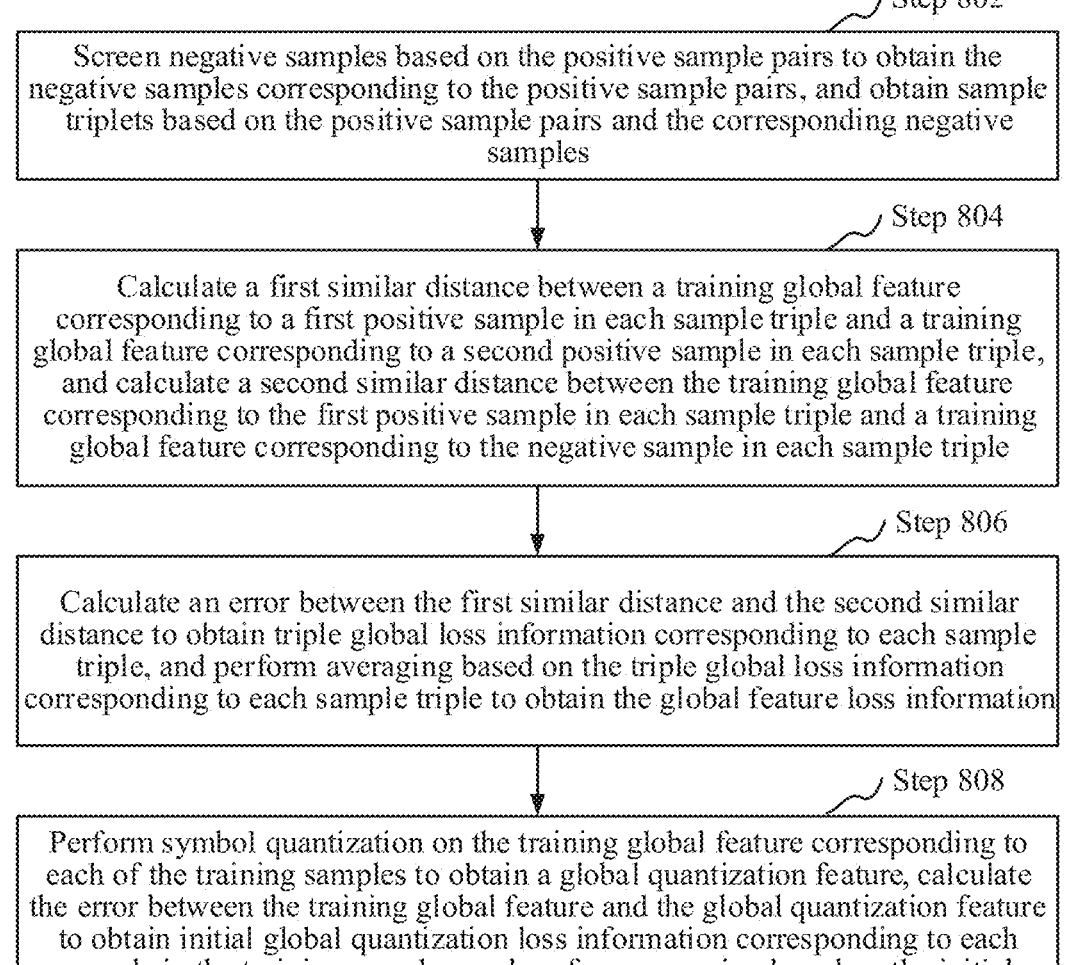

Step 802

Screen negative samples based on the positive sample pairs to obtain the negative samples corresponding to the positive sample pairs, and obtain sample triplets based on the positive sample pairs and the corresponding negative samples Step 804

Calculate a first similar distance between a training global feature corresponding to a first positive sample in each sample triple and a training global feature corresponding to a second positive sample in each sample triple, and calculate a second similar distance between the training global feature corresponding to the first positive sample in each sample triple and a training global feature corresponding to the negative sample in each sample triple Step 806

Calculate an error between the first similar distance and the second similar distance to obtain triple global loss information corresponding to each sample triple, and perform averaging based on the triple global loss information corresponding to each sample triple to obtain the global feature loss information Step 808

Perform symbol quantization on the training global feature corresponding to each of the training samples to obtain a global quantization feature, calculate the error between the training global feature and the global quantization feature to obtain initial global quantization loss information corresponding to each sample in the training samples, and perform averaging based on the initial global quantization loss information corresponding to each sample in the training samples, to obtain the global quantization loss information

FIG. 8

Step 902

Determine current positive sample pairs and to-be-mined positive sample pairs based on the positive sample pairs Step 904

Randomly select current positive samples from the current positive sample pairs, and randomly select to-be-mined samples from the to-be-mined positive sample pairs to obtain each to-be-mined sample Step 906

Calculate a similarity between each of the current positive samples and each of the to-be-mined samples, and determine a current negative sample corresponding to the current positive sample pair from the to-be-mined samples based on the similarity Step 908

Traverse the positive sample pairs to obtain negative samples corresponding to the positive sample pairs

FIG. 9

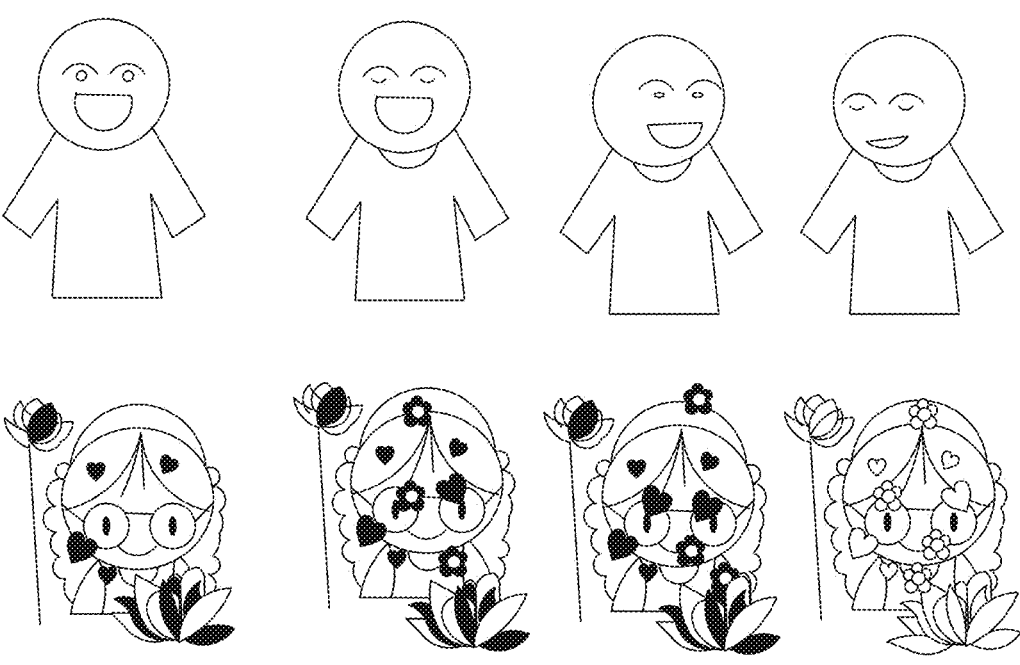

FIG. 10

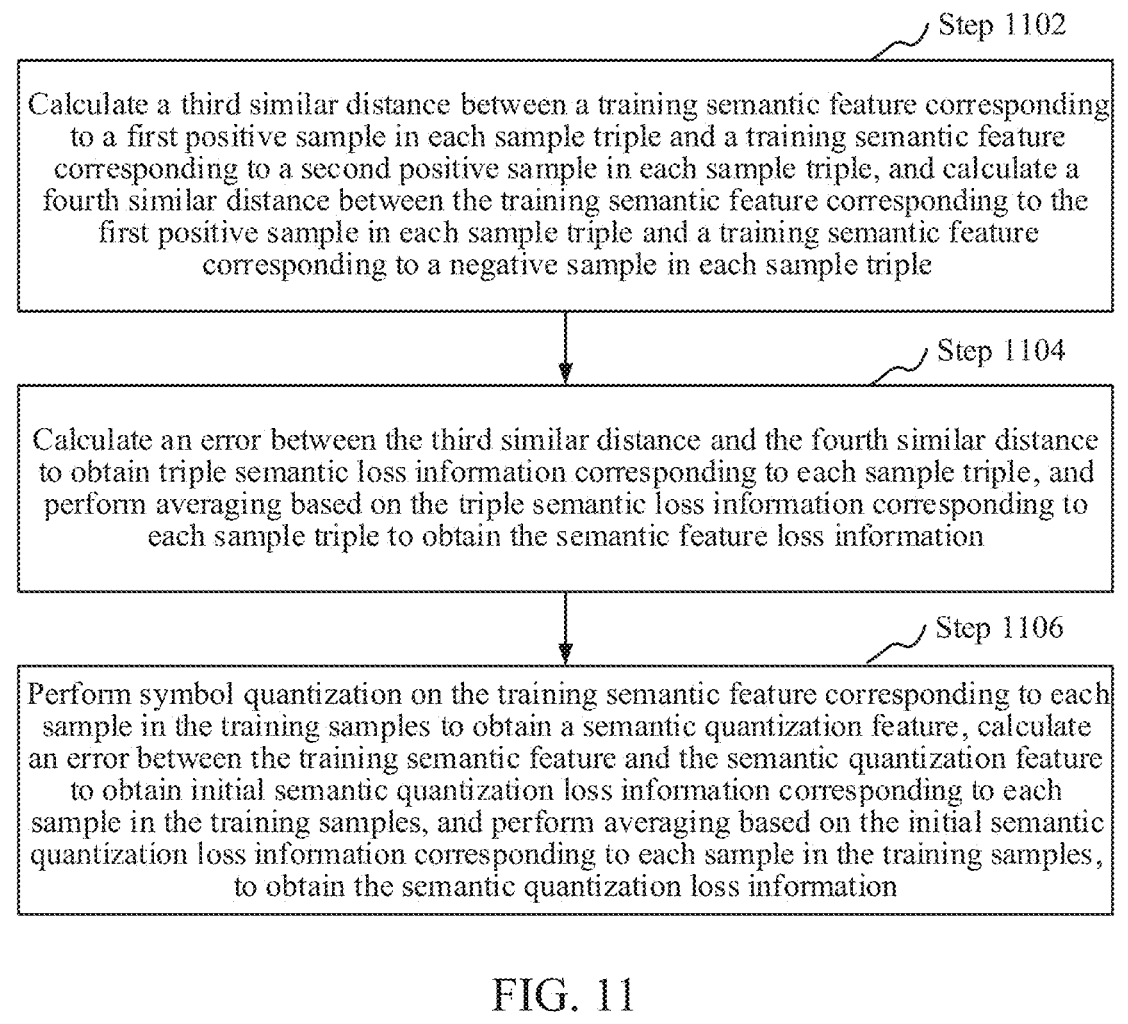

Step 1102

Calculate a third similar distance between a training semantic feature corresponding to a first positive sample in each sample triple and a training semantic feature corresponding to a second positive sample in each sample triple, and calculate a fourth similar distance between the training semantic feature corresponding to the first positive sample in each sample triple and a training semantic feature corresponding to a negative sample in each sample triple Step 1104

Calculate an error between the third similar distance and the fourth similar distance to obtain triple semantic loss information corresponding to each sample triple, and perform averaging based on the triple semantic loss information corresponding to each sample triple to obtain the semantic feature loss information Step 1106

Perform symbol quantization on the training semantic feature corresponding to each sample in the training samples to obtain a semantic quantization feature, calculate an error between the training semantic feature and the semantic quantization feature to obtain initial semantic quantization loss information corresponding to each sample in the training samples, and perform averaging based on the initial semantic quantization loss information corresponding to each sample in the training samples, to obtain the semantic quantization loss information

FIG. 11

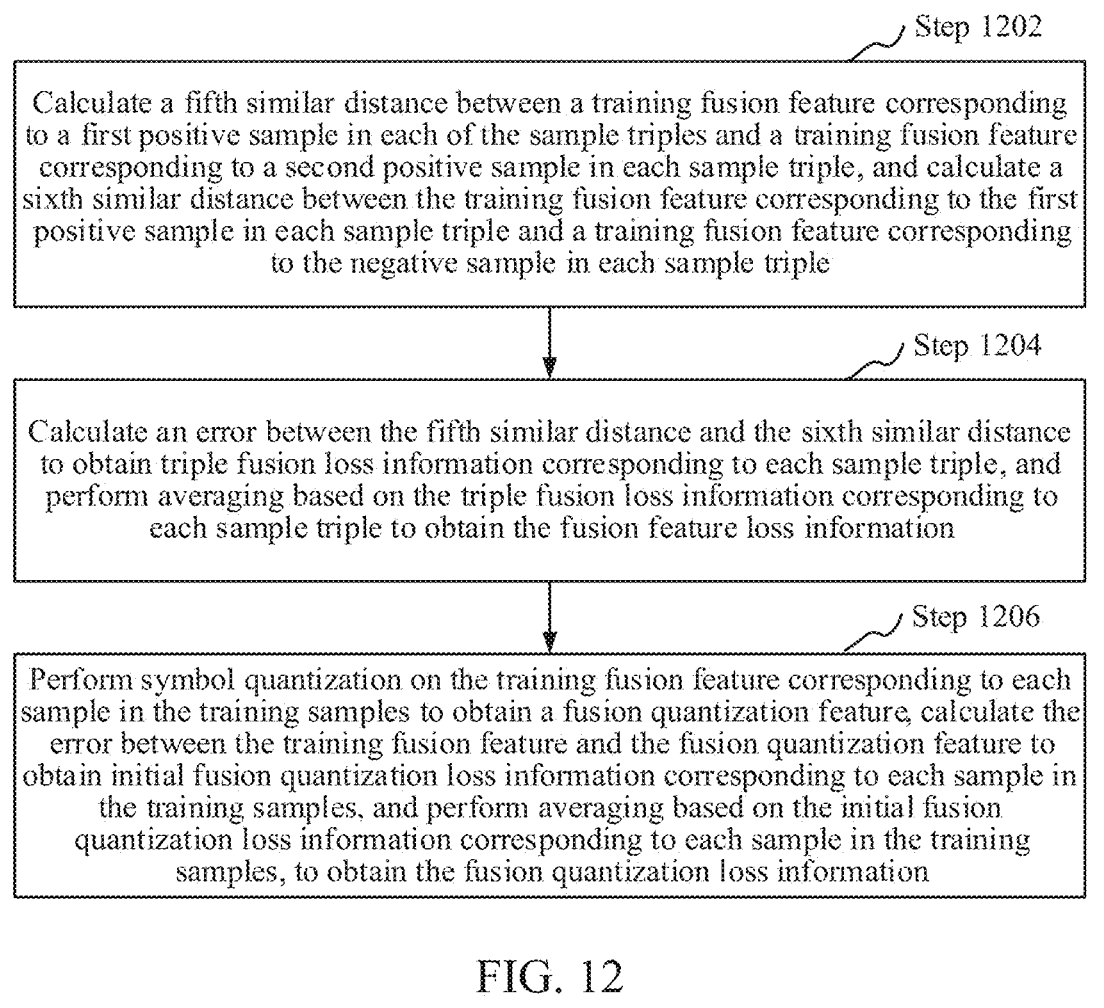

Step 1202

Calculate a fifth similar distance between a training fusion feature corresponding to a first positive sample in each of the sample triples and a training fusion feature corresponding to a second positive sample in each sample triple, and calculate a sixth similar distance between the training fusion feature corresponding to the first positive sample in each sample triple and a training fusion feature corresponding to the negative sample in each sample triple Step 1204

Calculate an error between the fifth similar distance and the sixth similar distance to obtain triple fusion loss information corresponding to each sample triple, and perform averaging based on the triple fusion loss information corresponding to each sample triple to obtain the fusion feature loss information Step 1206

Perform symbol quantization on the training fusion feature corresponding to each sample in the training samples to obtain a fusion quantization feature, calculate the error between the training fusion feature and the fusion quantization feature to obtain initial fusion quantization loss information corresponding to each sample in the training samples, and perform averaging based on the initial fusion quantization loss information corresponding to each sample in the training samples, to obtain the fusion quantization loss information

FIG. 12

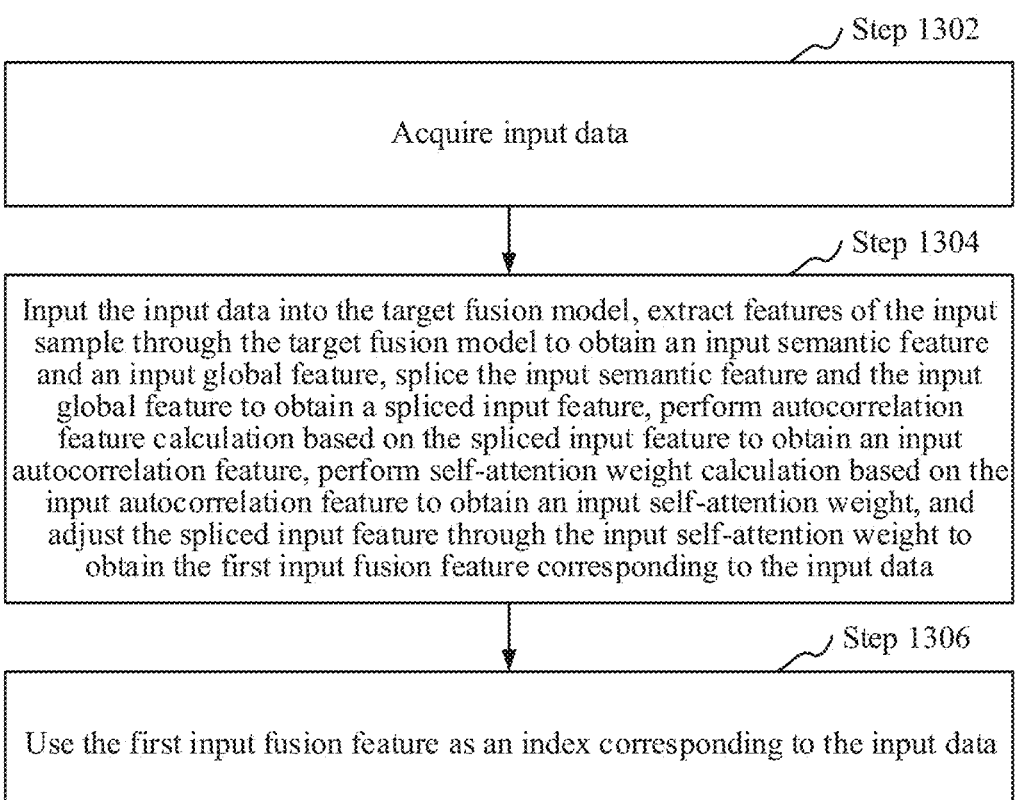

Step 1302

Acquire input data

Step 1304

Input the input data into the target fusion model, extract features of the input sample through the target fusion model to obtain an input semantic feature and an input global feature, splice the input semantic feature and the input global feature to obtain a spliced input feature, perform autocorrelation feature calculation based on the spliced input feature to obtain an input autocorrelation feature, perform self-attention weight calculation based on the input autocorrelation feature to obtain an input self-attention weight, and adjust the spliced input feature through the input self-attention weight to obtain the first input fusion feature corresponding to the input data Step 1306

Use the first input fusion feature as an index corresponding to the input data

FIG. 13

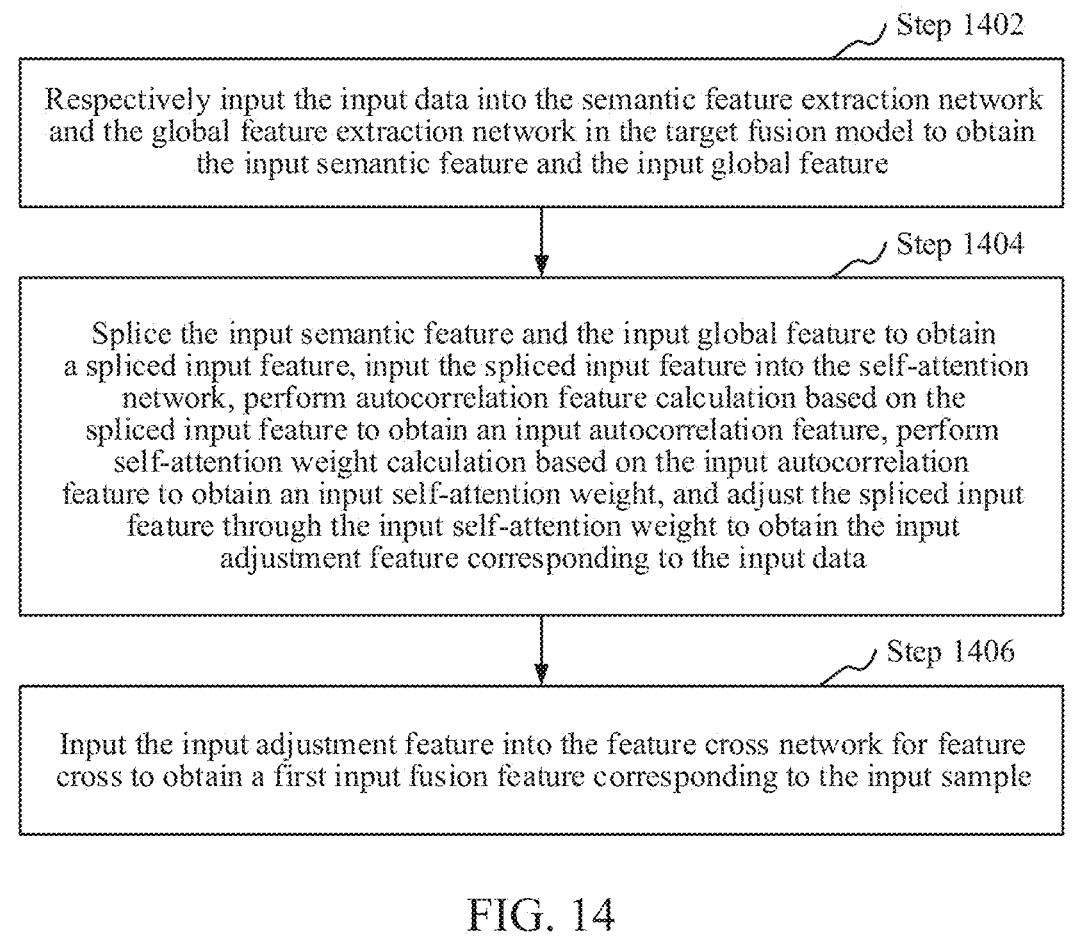

⌒/ Step 1402

Respectively input the input data into the semantic feature extraction network and the global feature extraction network in the target fusion model to obtain the input semantic feature and the input global feature ⌒/ Step 1404

Splice the input semantic feature and the input global feature to obtain a spliced input feature, input the spliced input feature into the self-attention network, perform autocorrelation feature calculation based on the spliced input feature to obtain an input autocorrelation feature, perform self-attention weight calculation based on the input autocorrelation feature to obtain an input self-attention weight, and adjust the spliced input feature through the input self-attention weight to obtain the input adjustment feature corresponding to the input data ⌒/ Step 1406

Input the input adjustment feature into the feature cross network for feature cross to obtain a first input fusion feature corresponding to the input sample

FIG. 14

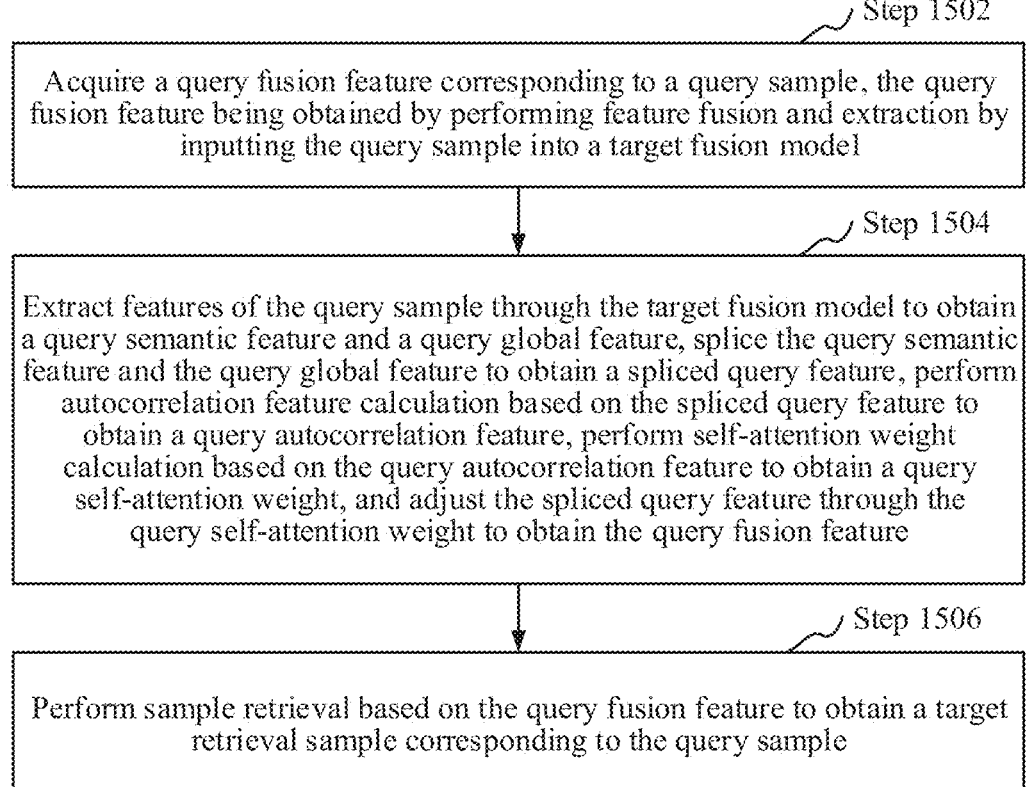

Step 1502

Acquire a query fusion feature corresponding to a query sample, the query fusion feature being obtained by performing feature fusion and extraction by inputting the query sample into a target fusion model Step 1504

Extract features of the query sample through the target fusion model to obtain a query semantic feature and a query global feature, splice the query semantic feature and the query global feature to obtain a spliced query feature, perform autocorrelation feature calculation based on the spliced query feature to obtain a query autocorrelation feature, perform self-attention weight calculation based on the query autocorrelation feature to obtain a query self-attention weight, and adjust the spliced query feature through the query self-attention weight to obtain the query fusion feature Step 1506

Perform sample retrieval based on the query fusion feature to obtain a target retrieval sample corresponding to the query sample

FIG. 15

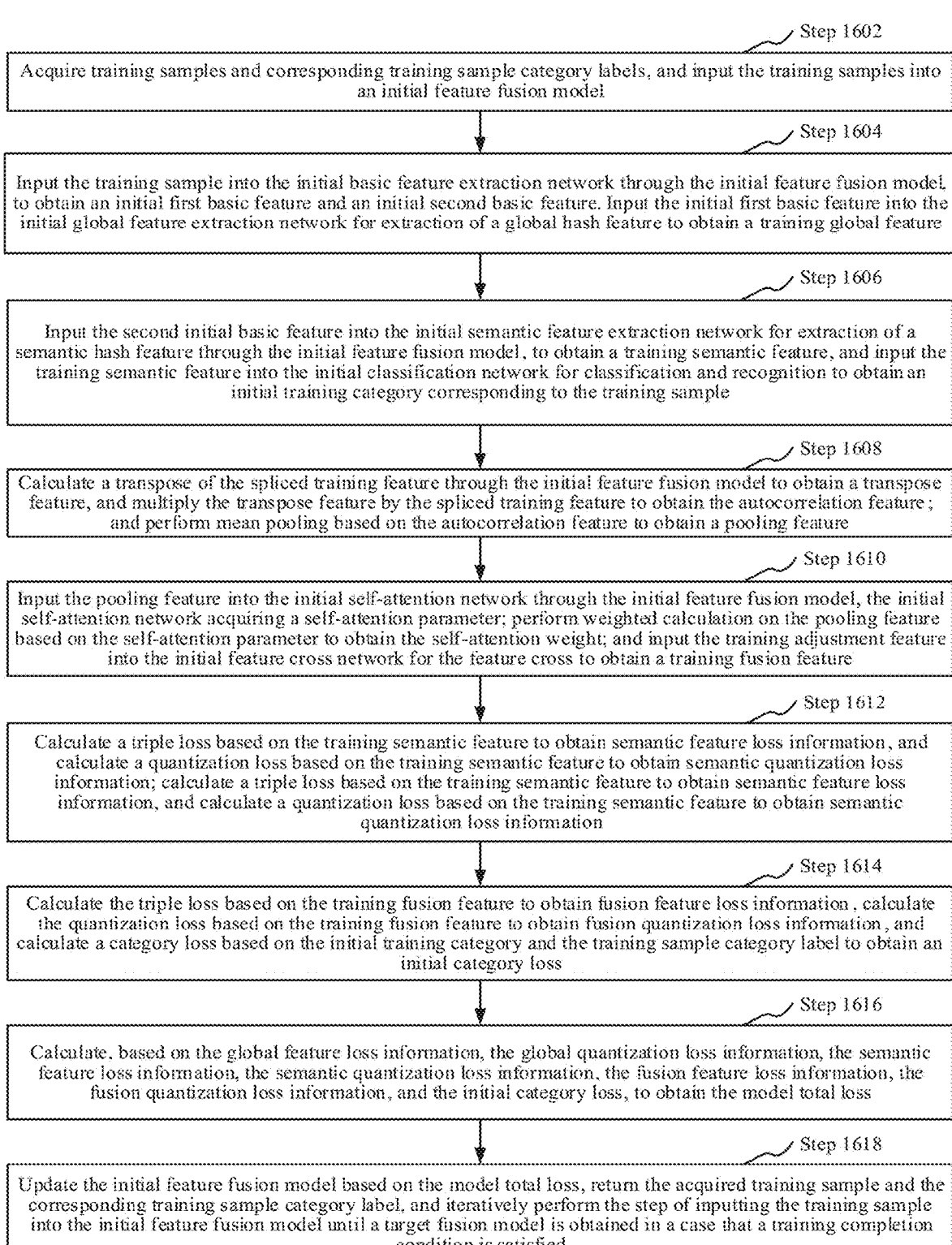

Step 1602

Acquire training samples and corresponding training sample category labels, and input the training samples into an initial feature fusion model Step 1604

Input the training sample into the initial basic feature extraction network through the initial feature fusion model, to obtain an initial first basic feature and an initial second basic feature. Input the initial first basic feature into the initial global feature extraction network for extraction of a global hash feature to obtain a training global feature Step 1606

Input the second initial basic feature into the initial semantic feature extraction network for extraction of a semantic hash feature through the initial feature fusion model, to obtain a training semantic feature, and input the training semantic feature into the initial classification network for classification and recognition to obtain an initial training category corresponding to the training sample Step 1608

Calculate a transpose of the spliced training feature through the initial feature fusion model to obtain a transpose feature, and multiply the transpose feature by the spliced training feature to obtain the autocorrelation feature ; and perform mean pooling based on the autocorrelation feature to obtain a pooling feature Step 1610

Input the pooling feature into the initial self-attention network through the initial feature fusion model, the initial self-attention network acquiring a self-attention parameter; perform weighted calculation on the pooling feature based on the self-attention parameter to obtain the self-attention weight; and input the training adjustment feature into the initial feature cross network for the feature cross to obtain a training fusion feature Step 1612

Calculate a triple loss based on the training semantic feature to obtain semantic feature loss information, and calculate a quantization loss based on the training semantic feature to obtain semantic quantization loss information; calculate a triple loss based on the training semantic feature to obtain semantic feature loss information, and calculate a quantization loss based on the training semantic feature to obtain semantic quantization loss information Step 1614

Calculate the triple loss based on the training fusion feature to obtain fusion feature loss information , calculate the quantization loss based on the training fusion feature to obtain fusion quantization loss information, and calculate a category loss based on the initial training category and the training sample category label to obtain an initial category loss Step 1616

Calculate, based on the global feature loss information, the global quantization loss information, the semantic feature loss information, the semantic quantization loss information, the fusion feature loss information, the fusion quantization loss information, and the initial category loss, to obtain the model total loss Step 1618

Update the initial feature fusion model based on the model total loss, return the acquired training sample and the corresponding training sample category label, and iteratively perform the step of inputting the training sample into the initial feature fusion model until a target fusion model is obtained in a case that a training completion condition is satisfied

METHOD, COMPUTER DEVICE, AND STORAGE MEDIUM, FOR FEATURE FUSION MODEL TRAINING AND SAMPLE RETRIEVAL

CROSS-REFERENCES TO RELATED APPLICATION

This application is a continuation application of PCT Patent Application No. PCT/CN2022/131477, filed on Nov. 11, 2022, which claims priority to Chinese Patent Application No. 2022100814381, filed on Jan. 24, 2022, all of which is incorporated herein by reference in their entirety.

FIELD OF THE TECHNOLOGY

The present disclosure relates to the field of computer technologies, and in particular, to a method and apparatus for feature fusion model training and sample retrieval, a computer device, a storage medium, and a computer program product.

BACKGROUND OF THE DISCLOSURE

With the development of artificial intelligence technologies, sample recognition technology has emerged. During sample recognition, the sample needs to be characterized first, followed by sample classification and recognition based on the sample characterization. In order to improve the accuracy of classification and recognition, different characterizations of the sample are usually recognized and then fused to obtain fused features. Classification and recognition are performed by using the fused features. Currently, the different characterizations of the sample are spliced directly to obtain a final sample feature. For example, two features having a dimension of 1×64 are spliced into a feature having a dimension of 1×128. However, splicing different characterizations directly may lead to a problem of redundancy of information among the different characterizations, causing the obtained sample feature to be inaccurate.

SUMMARY

According to an aspect, the present disclosure provides a feature fusion model training method. The method includes: acquiring a training sample and a corresponding training sample category label, and inputting the training sample into an initial feature fusion model; extracting a feature of the training sample through the initial feature fusion model to obtain a training semantic feature and a training global feature, and performing classification and recognition based on the training semantic feature to obtain an initial training category corresponding to the training sample; splicing the training semantic feature and the training global feature through the initial feature fusion model to obtain a spliced training feature, calculating an autocorrelation feature based on the spliced training feature to obtain an autocorrelation feature, calculating a self-attention weight based on the autocorrelation feature to obtain a self-attention weight, and adjusting the spliced training feature through the self-attention weight to obtain a fused training feature; calculating a feature loss based on the training global feature, the training semantic feature, and the fused training feature to obtain an initial feature loss, and calculating a category loss based on the initial training category and the training sample category label to obtain an initial category loss; and updating the initial feature fusion model based on the initial feature loss and the initial category loss, returning the acquired training sample and the corresponding training sample category label, and iteratively performing the operation of inputting the training sample into the initial feature fusion model until a target fusion model is obtained when a training completion condition is satisfied, the target fusion model being configured to fuse the semantic feature and the global feature extracted from input data to obtain a target fused feature, and use the target fused feature as an index of the input data.

According to another aspect, the present disclosure provides a computer device. The computer device includes a memory and a processor, the memory storing computer-readable instructions, and the processor, when executing the computer-readable instructions, implementing a method for feature fusion model training. The method includes: acquiring a training sample and a corresponding training sample category label, and inputting the training sample into an initial feature fusion model; extracting a feature of the training sample through the initial feature fusion model to obtain a training semantic feature and a training global feature, and performing classification and recognition based on the training semantic feature to obtain an initial training category corresponding to the training sample; splicing the training semantic feature and the training global feature through the initial feature fusion model to obtain a spliced training feature, calculating an autocorrelation feature based on the spliced training feature to obtain an autocorrelation feature, calculating a self-attention weight based on the autocorrelation feature to obtain a self-attention weight, and adjusting the spliced training feature through the self-attention weight to obtain a fused training feature; calculating a feature loss based on the training global feature, the training semantic feature, and the fused training feature to obtain an initial feature loss, and calculating a category loss based on the initial training category and the training sample category label to obtain an initial category loss; and updating the initial feature fusion model based on the initial feature loss and the initial category loss, returning the acquired training sample and the corresponding training sample category label, and iteratively performing the operation of inputting the training sample into the initial feature fusion model until a target fusion model is obtained when a training completion condition is satisfied, the target fusion model being configured to fuse the semantic feature and the global feature extracted from input data to obtain a target fused feature, and use the target fused feature as an index of the input data.

According to another aspect, the present disclosure provides a non-transitory computer-readable storage medium, storing computer-readable instructions, the computer-readable instructions, when executed by a processor, implementing the operations of a method for feature fusion model training. The method includes: acquiring a training sample and a corresponding training sample category label, and inputting the training sample into an initial feature fusion model; extracting a feature of the training sample through the initial feature fusion model to obtain a training semantic feature and a training global feature, and performing classification and recognition based on the training semantic feature to obtain an initial training category corresponding to the training sample; splicing the training semantic feature and the training global feature through the initial feature fusion model to obtain a spliced training feature, calculating an autocorrelation feature based on the spliced training feature to obtain an autocorrelation feature, calculating a self-attention weight based on the autocorrelation feature to obtain a self-attention weight, and adjusting the spliced training feature through the self-attention weight to obtain a fused training feature; calculating a feature loss based on the training global feature, the training semantic feature, and the fused training feature to obtain an initial feature loss, and calculating a category loss based on the initial training category and the training sample category label to obtain an initial category loss; and updating the initial feature fusion model based on the initial feature loss and the initial category loss, returning the acquired training sample and the corresponding training sample category label, and iteratively performing the operation of inputting the training sample into the initial feature fusion model until a target fusion model is obtained when a training completion condition is satisfied, the target fusion model being configured to fuse the semantic feature and the global feature extracted from input data to obtain a target fused feature, and use the target fused feature as an index of the input data.

Details of one or more embodiments of the present disclosure are provided in the accompanying drawings and descriptions below. Other features, objectives, and advantages of the present disclosure become apparent from the specification, the drawings, and the claims.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

FIG. 2 is a schematic flowchart of a method for feature fusion model training according to an embodiment of the present disclosure.

FIG. 3 is a schematic flowchart of obtaining an initial feature fusion model according to an embodiment of the present disclosure.

FIG. 8 is a schematic flowchart of obtaining global loss information according to an embodiment of the present disclosure.

FIG. 9 is a schematic flowchart of obtaining a negative sample according to an embodiment of the present disclosure.

FIG. 10 is a schematic diagram of an image sample pair according to an embodiment of the present disclosure.

FIG. 11 is a schematic flowchart of obtaining semantic loss information according to an embodiment.

FIG. 12 is a schematic flowchart of obtaining fusion loss information according to an embodiment of the present disclosure.

FIG. 13 is a schematic flowchart of obtaining an input data index according to an embodiment of the present disclosure.

FIG. 14 is a schematic flowchart of obtaining an input data index according to another embodiment of the present disclosure.

FIG. 15 is a schematic flowchart of a sample retrieval method according to an embodiment of the present disclosure.

FIG. 16 is a schematic flowchart of a method for feature fusion model training according to an embodiment of the present disclosure.

DESCRIPTION OF EMBODIMENTS

To make the objectives, technical solutions, and advantages of the present disclosure clearer, the following further describes the present disclosure in detail with reference to the accompanying drawings and the embodiments. It is to be understood that the specific embodiments described herein are only used for explaining the present disclosure, and are not used for limiting the present disclosure.

Figure 1:
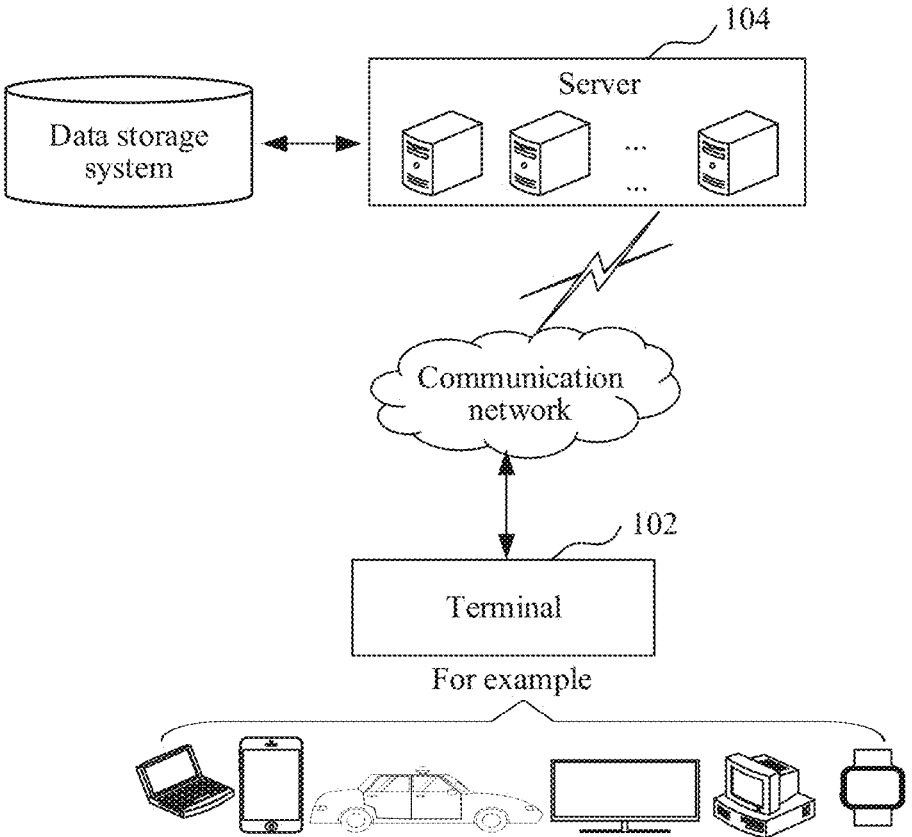
FIG. 1 is an application environment diagram of a method for feature fusion model training according to an embodiment of the present disclosure.

A method for feature fusion model training provided in an embodiment of the present disclosure may be applied to an application environment shown in FIG. 1. A terminal 102 communicates with a server 104 through a communication network. A data storage system may store data to be processed by the server 104. The data storage system may be integrated on the server 104, or may be placed on a cloud or other network servers. The server 104 may receive model training instructions transmitted by the terminal 102, and the server 104 acquires a training sample and a corresponding training sample category label from the data storage system based on the model training instructions, and inputs the training sample into an initial feature fusion model. The initial feature fusion model is configured to extract a feature of the training sample based on the training sample to obtain a training semantic feature and a training global feature, and perform classification and recognition based on the training semantic feature to obtain an initial training category corresponding to the training sample. The initial feature fusion model is configured to: splice the training semantic feature and the training global feature to obtain a spliced training feature, calculate an autocorrelation feature based on the spliced training feature to obtain an autocorrelation feature, calculate a self-attention weight based on the autocorrelation feature to obtain a self-attention weight, and adjust the spliced training feature through the self-attention weight to obtain a fused training feature. The server 104 is configured to calculate a feature loss based on the training global feature, the training semantic feature, and the fused training feature to obtain an initial feature loss, and calculate a category loss based on the initial training category and the training sample category label to obtain an initial category loss. The server 104 is configured to: update the initial feature fusion model based on the initial feature loss and the initial category loss, return the acquired training sample and the corresponding training sample category label, and iteratively perform the operation of inputting the training sample into the initial feature fusion model until a target fusion model is obtained when a training completion condition is satisfied, the target fusion model being configured to fuse the semantic feature and the global feature extracted from input data to obtain a target fused feature, and use the target fused feature as an index of the input data. The terminal 102 may be, but is not limited to, a plurality of desktop computers, laptops, smart phones, tablets, Internet of Things devices and portable wearable devices. The Internet of Thing device may be a smart speaker, a smart Television, a smart air conditioner, a smart vehicle mounted device, and so on. The portable wearable device may be a smart watch, a smart bracelet, a headset, and so on, and the terminal 102 may also be mounted with a client side, such as a model training service client side, a data retrieval service client side, and the like. The server 104 may be implemented by an independent server or a server cluster composed of a plurality of servers.

In an embodiment, as shown in FIG. 2, a method for feature fusion model training is provided. Taking the method applied to the server in FIG. 1 as an example for description. It may be understood that the method can also be applied to a terminal and to a system that includes a terminal and a server and is implemented through the interaction of the terminal and the server. This embodiment includes the following steps:

Step 202: Acquire a training sample and a corresponding training sample category label, and input the training sample into an initial feature fusion model.

The training sample is a sample used for training, and the training sample may have more than one. The training sample may be different types of samples. For example, the training sample may be an image, a text, a video, an audio, and the like. The training sample category label refers to a corresponding classification label of the training sample. The classification label is a category to which a sample object belongs, such as, a category to which the object in the image sample belongs and a category to which the content in the text belongs. The initial feature fusion model refers to a feature fusion model initialized by a model parameter. The feature fusion model is configured to fuse different features to obtain fused features. The parameter initialization may be random initialization or parameter initialization through pre-training, and the like.

Specifically, the server can obtain the training sample and the corresponding training sample category label from a database, from a data service side, and the training sample and the corresponding training sample category label uploaded by the terminal. Then, a neural network is configured to build the initial feature fusion model, and the training sample is inputted into the initial feature fusion model for training. That is to say, forward calculation is performed, and then reverse iteration is performed.

Step 204: Extract a feature of the training sample through the initial feature fusion model to obtain a training semantic feature and a training global feature, and perform classification and recognition based on the training semantic feature to obtain an initial training category corresponding to the training sample.

The training semantic feature refers to a feature extracted by the initial feature fusion model during training to characterize the semantic of the training sample. The training semantic feature is a feature that characterizes the detail. The training global feature refers to a feature extracted by the initial feature fusion model during training to characterize a whole of the training sample. The training global feature is a feature that characterizes the global whole. The initial training category refers to a category corresponding to the training sample identified during training.

Specifically, the initial feature fusion model in the server extracts features based on the training sample to obtain the training semantic feature and the training global feature, respectively. The extraction of the semantic feature can be performed through a semantic branch network, and the extraction of the training global feature can be performed through a global branch network. The training speech feature and the training global feature may be an extracted hash feature, which refer to sample characterization including binary feature vectors. The extracted hash feature for storage can compress feature storage space and save a storage resource. The hash feature for a sample retrieval can improve the retrieval efficiency. The training speech feature and the training global feature may also be floating-point features. Then, the training semantic feature is used for performing classification and recognition by a classification network to obtain the probabilities of each category corresponding to the training sample, and then the initial training category is obtained by filtering according to the probabilities of each category.

Step 206: Splice the training semantic feature and the training global feature through the initial feature fusion model to obtain a spliced training feature, calculate an autocorrelation feature based on the spliced training feature to obtain an autocorrelation feature, calculate a self-attention weight based on the autocorrelation feature to obtain a self-attention weight, and adjust the spliced training feature through the self-attention weight to obtain a fused training feature.

The spliced training feature is the feature obtained by splicing the first and last of the training semantic feature and the training global feature. The autocorrelation feature is used for characterizing an autocorrelation relationship within the spliced training feature. The autocorrelation relationship is used for characterizing a distribution difference of the values of each feature bit in the sample space, and a correlation between each feature value in the autocorrelation feature and each feature bit in the feature. A larger feature value leads to a greater correlation. The self-attention weight refers to an adjustment parameter calculated through a self-attention mechanism. The parameter is a hyperparameter after the training is completed, which is used for adjusting the spliced training feature. The fused training feature refers to a final unified feature. The fused training feature integrates information of the training semantic feature and the training global feature, and avoids information redundancy.

Specifically, the training semantic feature may be spliced tail-to-head with the training global feature by the initial feature fusion model to obtain the spliced training feature. The splicing may be performed by using the training semantic feature as a head and the training global feature as a tail. The splicing may also be performed by using the training global feature as the head and the training semantic feature as the tail. Then, the fused feature is extracted by using the spliced training feature through the self-attention mechanism. That is to say, the autocorrelation feature calculation is performed by using the spliced training feature to obtain the autocorrelation feature. Then, the self-attention parameter is used for adjusting the autocorrelation feature to obtain the self-attention weight, and the spliced training feature is weighted by the self-attention weight to obtain the fused training feature.

Step 208: Calculate a feature loss based on the training global feature, the training semantic feature, and the fused training feature to obtain an initial feature loss, and calculate a category loss based on the initial training category and the training sample category label to obtain an initial category loss.

The initial feature loss is used for characterizing an error of the feature obtained from training. The initial category loss is used for characterizing an error between the initial training category and the training sample category label.

Specifically, the server uses a preset feature loss function to calculate the loss of the training global feature, and calculates the loss of the training semantic feature, and calculates the loss of the fused training feature, and finally calculates the sum of all feature losses to obtain the initial feature loss. Then, the server uses a preset classification loss function to calculate an error between the initial training category and the training sample category label to obtain the initial category loss.

Step 210: Update the initial feature fusion model based on the initial feature loss and the initial category loss, return the acquired training sample and the corresponding training sample category label, and iteratively perform the operation of inputting the training sample into the initial feature fusion model until a target fusion model is obtained when a training completion condition is satisfied, the target fusion model being configured to fuse the semantic feature and the global feature extracted from input data to obtain a target fused feature, and use the target fused feature as an index of the input data.

Specifically, the server calculates the sum of the initial feature loss and the initial category loss, obtains the sum of all losses, and uses the sum of losses to reverse update the initial feature fusion model. That is to say, the parameters in the initial feature fusion model are updated to obtain the updated feature fusion model. Then, the updated feature fusion model is used as the initial feature fusion model and returned to obtain the training sample and the corresponding training sample category label. The operation of inputting the training sample into the initial feature fusion model is iteratively performed until the target fusion model is obtained when the training completion condition is reached. The training completion condition may be that the number of training times reaches the maximum number of iterations or the training loss reaches a preset loss threshold or the parameters of the model do not change. Then, the resulting target fusion model can be deployed and used. That is, when the input data is obtained, the input data is inputted into the target fusion model. The target fusion model extracts the semantic feature and the global feature, and fuses the semantic feature and the global feature to obtain the target fused feature. The target fused feature is used for characterizing the input data. That is to say, the target fused feature can be used as an index of the input data, that is, the input data can be retrieved using the target fused feature.

The feature fusion model training method obtains the spliced training feature by splicing the extracted training semantic feature and the training global feature when training the initial feature fusion model. Then, the autocorrelation feature calculation is performed on the spliced training feature to obtain the autocorrelation feature. Then, the self-attention weight is calculated by using the autocorrelation feature to obtain the self-attention weight, and the spliced training feature is adjusted by the self-attention weight to obtain the fused training feature, so that the obtained fused training feature can avoid information redundancy, and the accuracy of the obtained fused training feature is improved. Then, the initial feature fusion model is trained by a continuous training iteration, so that the trained target fusion model can improve the accuracy of the fusion of the semantic feature and the global feature.

In an embodiment, as shown in FIG. 3, before step 202, before the inputting the training sample into an initial feature fusion model, the method further includes the following steps:

Step 302: Acquire a pre-training sample and a corresponding pre-training sample category label, input the pre-training sample into a pre-training model, extract features of the pre-training sample through the pre-training model to obtain a pre-training semantic feature and a pre-training global feature, and perform classification and recognition based on the pre-training semantic feature to obtain a pre-training category corresponding to the pre-training sample.

Step 304: Calculate a feature loss based on the pre-training semantic feature and the pre-training global feature to obtain a pre-training feature loss, and calculate a category loss based on the pre-training category and the pre-training sample category label to obtain a pre-training category loss.

Step 306: Update the pre-training model based on the pre-training feature loss and the pre-training category loss, return the acquired pre-training sample and the corresponding pre-training sample category label, and iteratively perform the operation of inputting the pre-training sample into the pre-training model until a target pre-training model is obtained when a pre-training completion condition is satisfied.

The pre-training sample and the corresponding pre-training sample category label refer to the training sample and the corresponding training sample category label used during the pre-training. The pre-training sample may be the same or different from the training sample. The pre-training model refers to a neural network model whose model parameters are initialized. The parameter initialization can be random parameterization, zero initialization, Gaussian distribution initialization, and so on. The target pre-training model refers to the training model that has been trained. The target pre-training model has a pre-trained semantic feature extraction parameter, a global feature extraction parameter, and a classification parameter.

Specifically, the server establishes the pre-training model, and then inputs the pre-training sample into the pre-training model for pre-training, and the target pre-training model is obtained when the pre-training completion condition is reached. The pre-training completion condition can be that the number of pre-training times reaches a maximum number of iterations or the training loss reaches a preset loss threshold or the pre-training parameter does not change and so on. When training the target feature fusion model, two stages of training are required. The first stage can train the feature extraction parameter and the classification parameter in the target feature fusion model, and the second stage trains all parameters in the target feature fusion model. The first stage may be pre-training. The feature extraction parameter refers to the model parameter used in the semantic feature extraction and the global feature extraction. The classification parameter is the model parameter used for performing the classification. In a specific embodiment, a network parameter participating in the learning in the first stage uses a learning rate of 0.0005, and the learning rate per 10 rounds is adjusted to 0.1 times the original; and a network parameter participating in the learning in the second stage uses a learning rate of 0.00005, the other learning rate is 0.0005, and the learning rate per 10 rounds is adjusted to 0.1 times the original.

Step 308: Obtain the initial feature fusion model based on the target pre-training model.

Specifically, the trained parameter in the target pre-training model is taken as the corresponding initialization parameter in the initial feature fusion model, and then other parameters in the initial feature fusion model, such as the self-attention parameter, is initialized to obtain the initial feature fusion model.

In the above embodiment, the target pre-training model can be obtained through the pre-training. Then, the target pre-training model is configured to establish the initial feature fusion model, which can improve a convergence speed of the model training and improve the training efficiency.

In an embodiment, the initial feature fusion model includes an initial basic feature extraction network, an initial semantic feature extraction network, an initial global feature extraction network, and an initial classification network.

Figure 4:
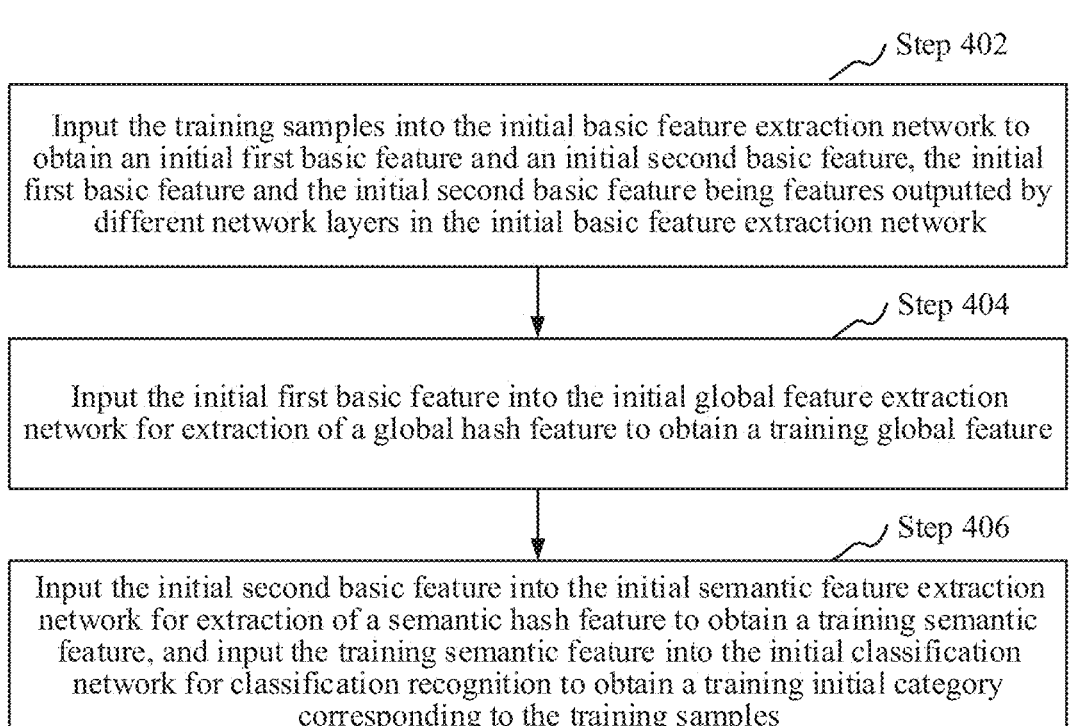
FIG. 4 is a schematic flowchart of obtaining an initial training category according to an embodiment of the present disclosure.

As shown in FIG. 4, step 204 of extracting a feature of the training sample based on the training sample to obtain a training semantic feature and a training global feature, and performing classification and recognition based on the training semantic feature to obtain an initial training category corresponding to the training sample includes:

Step 402: Input the training sample into the initial basic feature extraction network to obtain a first initial basic feature and a second initial basic feature, the first initial basic feature and the second initial basic feature being features outputted by different network layers in the initial basic feature extraction network.

The initial basic feature extraction network refers to a basic feature extraction network initialized by the network parameter, and the basic feature extraction network is applicable to extract the basic feature of the sample. the first initial basic feature and the second initial basic feature refer to the features outputted by different network layers of the initial basic feature extraction network. A dimension of the first initial basic feature is smaller than a dimension of the second initial basic feature. For example, if the first initial basic feature may be an output of a last network layer in the initial basic feature extraction network, the second initial basic feature may refer to the output of a last second network layer in the initial basic feature extraction network.

Specifically, the server uses the initial basic feature extraction network to perform the basic feature extraction on the training sample, and obtains the first initial basic feature and the second initial basic feature outputted by different network layers. The dimension of the output feature of the different network layer gradually decreases, that is, the dimension of the first initial basic feature is smaller than the dimension of the second initial basic feature. In a specific embodiment, the basic feature extraction network may be a pre-training ResNet101 (a residual Network 101). A network structure of the basic feature extraction network can be shown in Table 1 below.

TABLE 1

| Network structure table of basic feature extraction network | | |
| --- | --- | --- |
| Layer name | Output size | ResNet-101 (Residual Network 101) |
| Conv1 | 300 × 500 | 7 × 7, 64, stride 2 |
| Conv2_x | 150 × 250 | 3 × 3 max pool, stride 2 |
| | | 1 × 1, 64      ×3 blocks |
| | | 3 × 3, 64 |
| | | 1 × 1, 256 |
| Conv3_x | 76 × 126 | 1 × 1, 128      ×4 blocks |
| | | 3 × 3, 128 |
| | | 1 × 1, 512 |
| Conv4_x | 38 × 63 | 1 × 1, 256      ×23 blocks |
| | | 3 × 3, 256 |
| | | 1 × 1, 1024 |
| Conv5_x | 19 × 32 | 1 × 1, 512      ×3 blocks |
| | | 3 × 3, 512 |
| | | 1 × 1, 2048 |

The feature outputted by a fourth convolutional layer is used as the second initial basic feature, and the feature outputted by a fifth convolutional layer is used as the first initial basic feature.

Step 404: Input the first initial basic feature into the initial global feature extraction network for extraction of a global hash feature to obtain a training global feature.

The initial global feature extraction network refers to the global feature extraction network initialized by the network parameter.

Specifically, the server uses the first initial basic feature for global hash feature extraction, that is, the first initial basic feature is inputted to the initial global feature extraction network for the global hash feature extraction, to obtain the training global feature. In a specific embodiment, a network structure of the global feature extraction network can be shown in Table 2 below.

TABLE 2

| Network structure table of global feature extraction network | | |
| --- | --- | --- |
| Layer name | Output size | Layer |
| Pool | 1 × 2048 | Max pool |
| Hash1 | 1 × 64 | full connection |

The input of the global feature extraction network is the output of the last layer in Table 1, and the output is a 1×64 dimensional global feature. The global feature is a vector whose eigenvalues tend to be −1 or 1.

Step 406: Input the second initial basic feature into the initial semantic feature extraction network for extraction of a semantic hash feature to obtain a training semantic feature, and input the training semantic feature into the initial classification network for classification and recognition to obtain an initial training category corresponding to the training sample.

The initial semantic feature extraction network refers to the semantic feature extraction network initialized by the network parameter. The initial classification network refers to the classification network initialized by the network parameter.

Specifically, the server uses the initial semantic feature extraction network for semantic hash feature extraction, that is, the second initial basic feature is inputted to the initial semantic feature extraction network for the semantic hash feature extraction, to obtain the training semantic feature. Then, the training semantic feature is inputted into the initial classification network for the classification and recognition, and the corresponding initial training category of the training sample is obtained. The use of the second basic feature as the input to the semantic feature extraction network is to avoid information interference and to cause the extracted semantic feature more accurate.

In a specific embodiment, a network structure of the initial semantic feature extraction network and the initial classification network is shown in Table 3 below.

TABLE 3

| Network structure table of initial semantic feature extraction network and initial classification network | | | |
|---|---|---|---|
| Layer name | Output size | ResNet-101 (Residual Network 101) | Layer name |
| Conv6_x | 10 × 16 | 1 × 1, 512 3 × 3, 512 1 × 1, 2048 | ×3 blocks |
| Pool | 1 × 2048 | Max pool | |
| Hash2 | 1 × 64 | full connection | |
| Class | 1 × 100 | full connection | |

The number of classification layer categories can be adjusted according to an actual need, and the number of classification layers is 100 categories. By using the second basic feature as the input, deeper semantic information is extracted from the second basic feature, and the output of the hash layer 2 is a 1×64 dimensional semantic feature. The semantic feature is a vector whose eigenvalues tend to be −1 or 1, and then use the semantic feature to classify through the classification layer, and output the probability of each category to finally determine the category of the sample.

In the above embodiment, by training the initial basic feature extraction network, the initial semantic feature extraction network, the initial global feature extraction network, and the initial classification network, the trained feature fusion model is more accurate.

Figure 5:
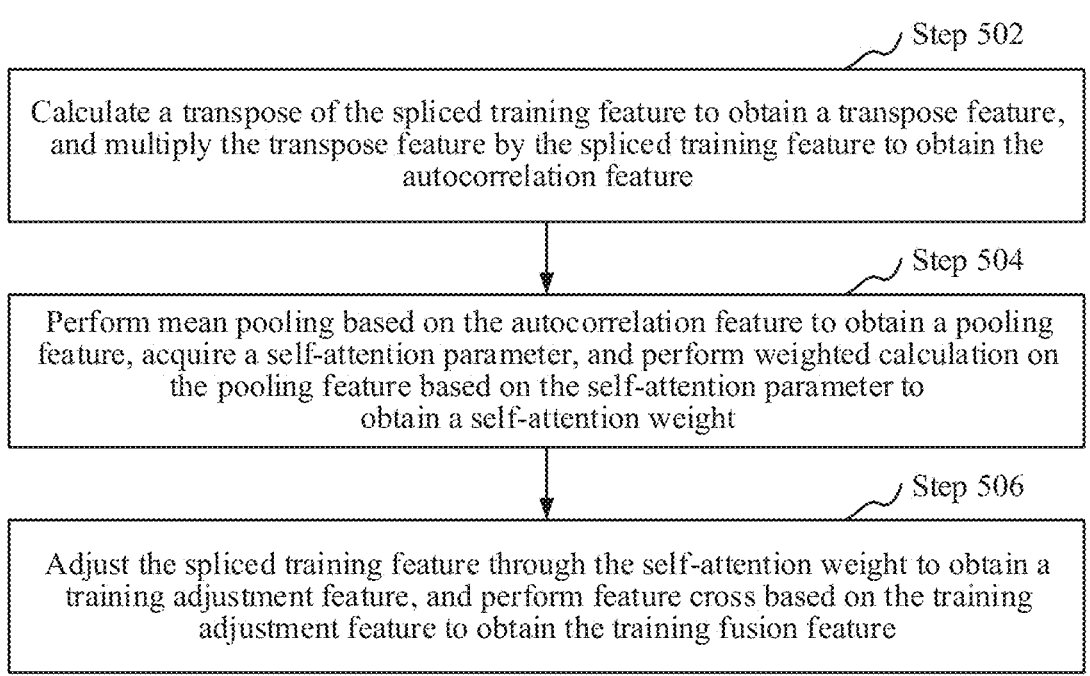
FIG. 5 is a schematic flowchart of obtaining a fused training feature according to an embodiment of the present disclosure.

In an embodiment, as shown in FIG. 5, step 206 of calculating an autocorrelation feature based on the spliced training feature to obtain an autocorrelation feature, calculating a self-attention weight based on the autocorrelation feature to obtain a self-attention weight, and adjusting the spliced training feature through the self-attention weight to obtain a fused training feature includes:

Step 502: Calculate a transpose of the spliced training feature to obtain a transposed feature, and multiply the transposed feature by the spliced training feature to obtain the autocorrelation feature.

The transposed feature refers to the vector obtained after transposing the spliced training feature.

Specifically, the server transposes the spliced training feature corresponding to the training sample to obtain the transposed feature corresponding to the training sample. Then, the transposed feature and the spliced training feature are multiplied by the feature vector to obtain the autocorrelation feature.

Step 504: Perform mean pooling based on the autocorrelation feature to obtain a pooling feature, acquire a self-attention parameter, and perform weighted calculation on the pooling feature based on the self-attention parameter to obtain a self-attention weight.

The pooling feature refers to the feature obtained after the pooling. The self-attention parameter refers to the network parameter of the initial self-attention layer.

Specifically, the server performs the mean pooling on the autocorrelation feature to obtain the pooling feature, and the server can also perform the maximum pooling on the autocorrelation feature to obtain the pooling feature. Then, the weighting calculation of the pooling feature is performed by using the network parameter of the initial self-attention layer, that is, the feature matrix point multiplication operation is performed, to obtain the self-attention weight.

Step 506: Adjust the spliced training feature through the self-attention weight to obtain a training adjustment feature, and perform feature crossing based on the training adjustment feature to obtain the fused training feature.

Specifically, the server uses the self-attention weight to weight the spliced training feature, and obtains the final self-attention fusion result through the autocorrelation between the data and the feature, that is, the training adjustment feature, so that the obtained training adjustment feature reduces the redundant information in the feature. Then, the feature crossing is performed by the neural network to obtain the fused training feature. Therefore, the feature redundancy information in the obtained fused training feature can be further compressed through feature crossing, which further improves the accuracy of the obtained fused training feature.

Figure 6:
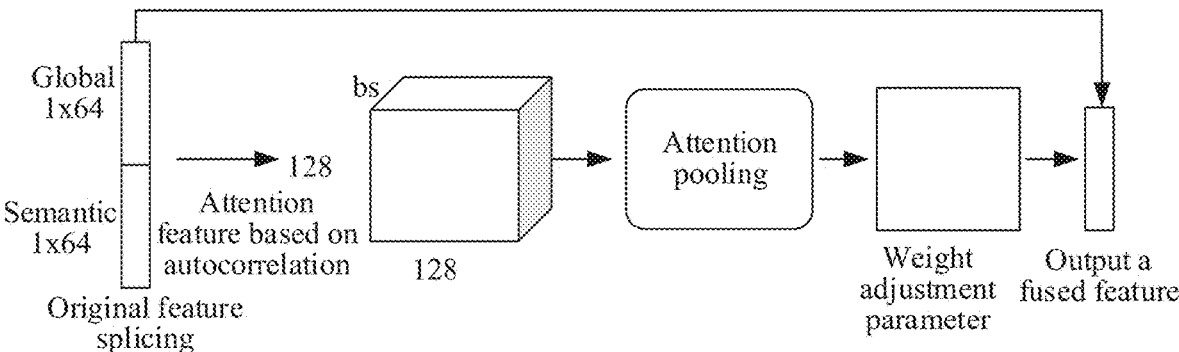
FIG. 6 is a schematic diagram of obtaining a fused training feature according to an embodiment of the present disclosure.

In a specific embodiment, FIG. 6 is a schematic diagram of obtaining a fused training feature. When training sample are the same batch of samples, that is, when a number bs (a positive integer, a sample number in each batch) of training sample are provided, a number bs of spliced training features having a dimension of 1×128 are obtained, that is, a feature vector having a dimension of (bs)×128 are obtained. Then, an autocorrelation matrix having a dimension of 128×128 is calculated for each feature vector. The matrix characterizes a correlation between each feature bit and other 128 bits. A larger correlation matrix value indicates a greater correlation. Values on diagonals are all 1. Then, mean pooling is performed on the bs autocorrelation matrices along the bs dimension to obtain a pooling matrix. For example, for an autocorrelation matrix of (i, j, n), n=1, . . . , bs, averaging is performed to obtain a value of the pooled matrix at a position (i, j), which characterizes an average correlation between an $i^{th}$ bit and a $j^{th}$ bit on the batch data. When the pooling matrix (i, j) is close to 1, it indicates that values of the $i^{th}$ bit and the $j^{th}$ bit tend to be the same for almost all the bs samples. When two bits are correlated in the average performance of the samples, the two bits are redundant. Then, a self-attention weight is obtained by using the pooling matrix to be multiplied by a weight condition parameter, that is, a self-attention parameter of a self-attention layer. Subsequently, the self-attention weight is multiplied by the spliced training feature to obtain a final self-attention fusion result having been subjected to data-feature autocorrelation, which is the adjusted training feature. Finally, feature crossing is performed on the adjusted training matrix through the neural network to obtain a fused training feature. In this way, the feature redundancy information may be further compressed through feature crossing.

In an embodiment, the initial feature fusion model includes an initial self-attention network and an initial feature crossing network.

Step 504 of acquiring a self-attention parameter and performing weighted calculation on the pooling feature based on the self-attention parameter to obtain a self-attention weight includes:

inputting the pooling feature into the initial self-attention network, the initial self-attention network being configured to acquire a self-attention parameter, and perform weighted calculation on the pooling feature based on the self-attention parameter to obtain the self-attention weight.

The initial self-attention network refers to the self-attention network initialized by the network parameter.

Specifically, the server can calculate the self-attention weight through the initial self-attention network, and use the self-attention parameter in the initial self-attention network to calculate and obtain the self-attention weight.

In a specific embodiment, the network structure of the self-attention network is shown in Table 4 below.

TABLE 4

| Network structure table of self-attention network | | |
| --- | --- | --- |
| Layer name | Output size | Layer |
| Concat | 1 × 128 | full connection |
| Self-attention | 1 × 128 | full connection |

The self-attention network input is a result of splicing the outputs of Table 2 and Table 3. The outputs of Table 2 may be spliced tail-to-head with the outputs of Table 3, or the outputs of Table 3 may be spliced tail-to-end with the outputs of Table 2, to obtain the self-attention weight. Then the self-attention weight is adjusted to the spliced training feature, and finally the training adjustment feature is outputted.

Step 506 of performing feature crossing based on the training adjustment feature to obtain the fused training feature includes:

inputting the training adjustment feature into the initial feature crossing network for the feature crossing to obtain a fused training feature.

The initial feature crossing network is a feature crossing network initialized by the network parameter, which is configured to compress a redundant hash bit.

Specifically, the server performs the feature crossing on the training adjustment feature, and uses the initial feature crossing network to obtain the fused training feature.

In a specific embodiment, a network structure table of the feature crossing network is shown in Table 5 below.

TABLE 5

| feature crossing network structure table | | |
| --- | --- | --- |
| Layer name | Output size | Layer |
| Hashall (Feature crossing layer) | 1 × 1024 | full connection |
| Hashall (Final hash layer) | 1 × 96 | full connection |

The feature crossing network outputs the hash feature obtained by the final fusion, which is a vector of 1*96 dimensions tending to −1 or 1. Due to the reduction of useless or redundant hash bits, the actual valid bits of all the final fused hash features are less than those of the directly spliced features.

Figure 7:
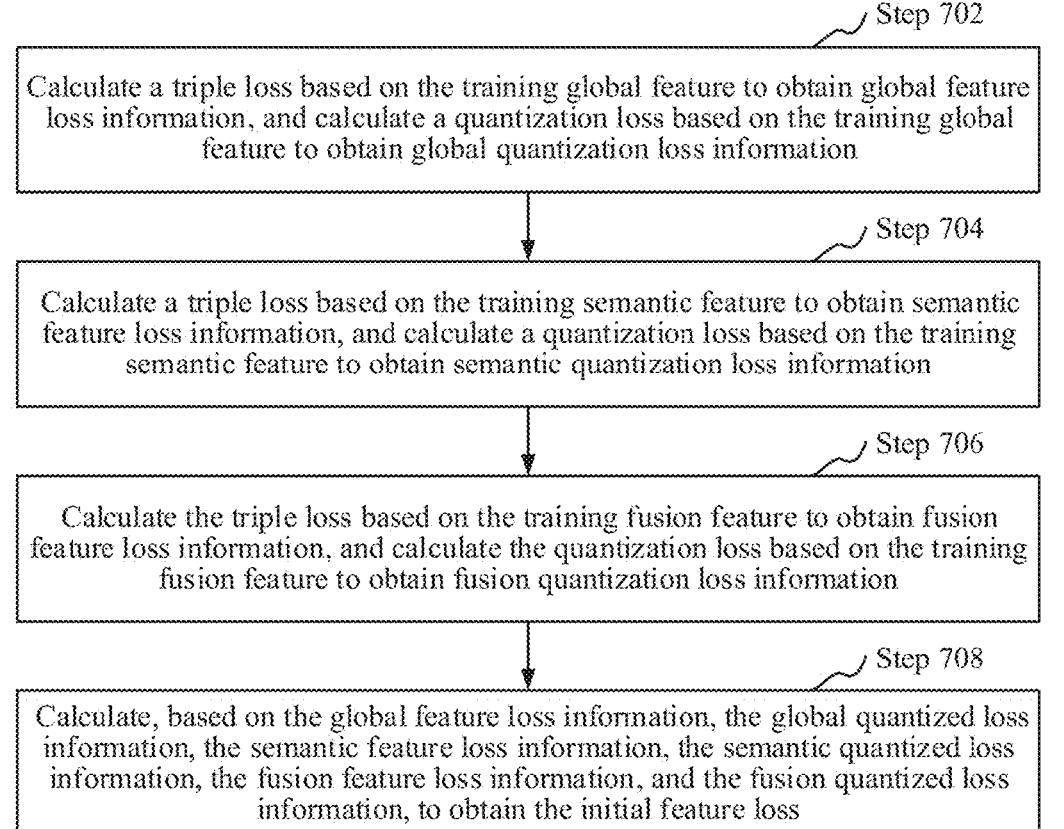
FIG. 7 is a schematic flowchart of obtaining an initial feature loss according to an embodiment of the present disclosure.

In an embodiment, as shown in FIG. 7, step 208 of calculating a feature loss based on the training global feature, the training semantic feature, and the fused training feature to obtain an initial feature loss includes:

Step 702: Calculate a triple loss based on the training global feature to obtain global feature loss information, and calculate a quantization loss based on the training global feature to obtain global quantization loss information.

The global feature loss information refers to a triplet loss for the training global feature, which is used for characterizing the error between a positive sample pair distance and a negative sample pair distance. The global quantization loss information is a quantized error corresponding to the training global feature.

Specifically, the server uses the triple loss function to calculate the global feature loss information corresponding to the training global feature. The server uses the training global feature for symbolic quantization to obtain a quantized label, and then uses the regression loss function to calculate the error between the training global feature through the quantized label to obtain the global quantization loss information.

Step 704: Calculate a triple loss based on the training semantic feature to obtain semantic feature loss information, and calculate a quantization loss based on the training semantic feature to obtain semantic quantization loss information.

The semantic feature loss information refers to the triple loss of the training semantic feature, and the semantic quantization loss information is a quantized error corresponding to the training global feature.

Specifically, the server uses the triplet loss function to calculate the semantic feature loss information corresponding to the training semantic feature. The server uses the training semantic feature for symbolic quantization to obtain a quantized label, and then uses the regression loss function to calculate the error between the training semantic feature through the quantized label to obtain the semantic quantization loss information.

Step 706: Calculate the triple loss based on the fused training feature to obtain fused feature loss information, and calculate the quantization loss based on the fused training feature to obtain fusion quantization loss information.

The fused feature loss information refers to the triple loss of the fused training feature, and the fusion quantization loss information is a quantized error corresponding to the fused training feature.

Specifically, the server uses the triplet loss function to calculate the fused feature loss information corresponding to the fused training feature. The server uses the fused training feature for fusion quantization to obtain a quantized label, and then uses the regression loss function to calculate the error between the fused training feature through the quantized label to obtain the fusion quantization loss information.

Step 708: Calculate, based on the global feature loss information, the global quantization loss information, the semantic feature loss information, the semantic quantization loss information, the fused feature loss information, and the fusion quantization loss information, to obtain the initial feature loss.

Specifically, the server can directly calculate a loss information sum of the global feature loss information, the global quantization loss information, the semantic feature loss information, the semantic quantization loss information, the fused feature loss information, and the fusion quantization loss information to obtain the initial feature loss. The server may also use the corresponding preset weights to respectively weight the global feature loss information, the global quantization loss information, the semantic feature loss information, the semantic quantization loss information, the fused feature loss information, and the fusion quantization loss information, and calculate the weighted sum to obtain the initial feature loss.

In the above embodiment, the initial feature loss can be obtained by calculating the global feature loss information, the global quantization loss information, the semantic feature loss information, the semantic quantization loss information, the fused feature loss information, and the fusion quantization loss information, thereby improving the accuracy of the initial feature loss.

In an embodiment, the training sample includes positive sample pairs.

As shown in FIG. 8, step 702 of calculating a triple loss based on the training global feature to obtain global feature loss information, and calculating a quantization loss based on the training global feature to obtain global quantization loss information includes:

Step 802: Screen negative samples based on the positive sample pairs to obtain the negative samples corresponding to the positive sample pairs, and obtain sample triplets based on the positive sample pairs and the corresponding negative samples.

The positive sample pair includes two positive samples, the two positive samples correspond to the same category, or the two positive samples are highly similar. The negative sample is a sample that is different from the positive sample category or not highly similar.

Specifically, the server filters the negative sample from the sample in each positive sample pair, selects the negative sample corresponding to the positive sample in each positive sample pair, and then obtains each sample triple according to each positive sample pair and the corresponding negative sample. The sample triple includes a first positive sample, a second positive sample and a negative sample.

Step 804: Calculate a first similar distance between a training global feature corresponding to a first positive sample in each sample triple and a training global feature corresponding to a second positive sample in each sample triple, and calculate a second similar distance between the training global feature corresponding to the first positive sample in each sample triple and a training global feature corresponding to the negative sample in each sample triple.

The first similar distance is used for characterizing a similar distance between the training global features of the positive samples in the sample triplet. The second similar distance is used for characterizing a similar distance between the training global feature of the positive sample and the training global feature of the negative sample in the sample triple. The similar distance may be calculated by using a similarity algorithm. The similarity algorithm may be a distance similarity algorithm, a cosine similarity algorithm, and the like.

Specifically, the server calculates the first similar distance between the training global feature corresponding to the first positive sample in the sample triple and the training global feature corresponding to the second positive sample in the sample triple, and calculates the second similar distance between the training global feature corresponding to the first positive sample in the sample triple and the training global feature corresponding to the negative sample in the sample triple. The server can also calculate the similar distance between the training global feature corresponding to the second positive sample and the training global feature corresponding to the negative sample to obtain the second similar distance. The Euclidean distance algorithm can be used for calculating the similar distance between feature vectors.

Step 806: Calculate an error between the first similar distance and the second similar distance to obtain triple global loss information corresponding to each sample triple, and perform averaging based on the triple global loss information corresponding to each sample triple to obtain the global feature loss information.

The triple global loss information refers to the loss information of the global feature calculated by the sample triple. Each sample triplet has corresponding triple global loss information.

Specifically, the server calculates an error between the first similar distance and the second similar distance to obtain triple global loss information corresponding to each sample triple, and performs averaging based on the triple global loss information corresponding to each sample triple to obtain the global feature loss information.

Step 808: Perform symbol quantization on the training global feature corresponding to each of the training sample to obtain a global quantization feature, calculate the error between the training global feature and the global quantization feature to obtain initial global quantization loss information corresponding to each sample in the training sample, and perform averaging based on the initial global quantization loss information corresponding to each sample in the training sample, to obtain the global quantization loss information.

The global quantization feature refers to the quantized feature obtained after the symbolic quantization of the training global feature. The initial global quantization loss information refers to the quantization loss corresponding to the training global feature, and each training global feature has the corresponding initial global quantization loss information.

Specifically, the server performs the symbolic quantization on all training global features corresponding to the training sample, and obtains the corresponding global quantization feature of each training global feature. The symbolic quantization can be performed by using the sign function to produce the quantized target code. Then, the regression loss function is used for calculating the error between the training global feature and the global quantization feature, and the initial global quantization loss information corresponding to each sample in the training sample is obtained. Then, the initial global quantization loss information corresponding to each sample in the training sample is averaged to obtain the global quantization loss information. By calculating the initial global quantization loss information corresponding to each sample, and then averaging all the initial global quantization loss information, the global quantization loss information is obtained, which improves the accuracy of the obtained global quantization loss information.

In an embodiment, as shown in FIG. 9, step 802 of screening negative samples based on the positive sample pairs to obtain the negative samples corresponding to the positive sample pairs includes:

Step 902: Determine current positive sample pairs and to-be-mined positive sample pairs based on the positive sample pairs.

The to-be-mined positive sample pair refers to the positive sample pair that needs to be screened by the negative sample, and is all positive sample pairs in each positive sample pair except a current positive sample pair.

Specifically, the server sequentially takes each positive sample pair as the current positive sample and determines the corresponding to-be-mined positive sample pair. Two positive samples in the positive sample pair may be exactly the same sample, or may be extremely similar samples or attack samples generated by an attack. For example, in the schematic diagram of the image sample shown in FIG. 10, the positive sample pair can be two people image samples that are extremely similar as shown in a first row in FIG. 10, or two image samples generated by the image attack as shown in a second row in FIG. 10. The image attack can include a plurality of types at the same time, such as a color change, a chroma change, cropping, brightness, filter, and the like.

Step 904: Randomly select current positive samples from the current positive sample pairs, and randomly select to-be-mined samples from the to-be-mined positive sample pairs to obtain each to-be-mined sample.

The current positive sample refers to a sample in the current positive sample pair, and the to-be-mined sample refers to the sample in the to-be-mined positive sample pair.

Specifically, the server randomly selects the sample from each positive sample pair to obtain the current sample and each to-be-mined sample. The server can also select the current sample and each to-be-mined sample from each positive sample pair according to a preset selection object. For example, it can specify that the first sample from the positive sample pair is selected as the current sample, or it can specify that the second sample from the positive sample pair is selected as the current sample.

Step 906: Calculate a similarity between each of the current positive samples and each of the to-be-mined samples, and determine a current negative sample corresponding to the current positive sample pair from the to-be-mined samples based on the similarity.

The similarity is used for characterizing the similarity between the current positive sample and the to-be-mined sample. The current negative sample refers to the negative sample corresponding to the current positive sample pair obtained by screening.

Specifically, the server uses the similarity algorithm to calculate the similarity between the current sample and the to-be-mined sample. The similarity algorithm can use the distance similarity algorithm, for example, the Euclidean distance algorithm, the Manhattan distance algorithm, or the cosine similarity algorithm can be used. Then, the to-be-mined sample is sorted from small to large by the similarity, and the smallest to-be-mined sample is selected as the current negative sample corresponding to the current positive sample pair. The server may also perform sample removal according to a preset denoising quantity after sorting the to-be-mined samples from small to large, for example, remove top 5 to-be-mined samples. Then, the smallest to-be-mined sample is selected from the remaining to-be-mined samples as the current negative sample corresponding to the current positive sample pair. Alternatively, the preset number of current negative samples can be selected from the remaining to-be-mined samples in sequence, and then the sample triplet of the preset number obtained from the current sample can be obtained. The preset number can be set according to requirements, such as 20.

Step 908: Traverse the positive sample pairs to obtain negative samples corresponding to the positive sample pairs.

Specifically, the server filters the negative sample for the positive sample pair, and obtains the negative sample corresponding to the positive sample pair. The negative sample may be a plurality, the plurality may be at least two, and finally all sample triples are obtained.

In the above embodiment, the negative sample corresponding to the positive sample pair can be obtained through the negative sample screening based on the positive sample pair, thereby obtaining the sample triple, which can make the obtained sample triple higher quality, thereby improving the accuracy of the training.

In an embodiment, the training sample includes each sample triplet.

As shown in FIG. 11, step 704 of calculating a triple loss based on the training semantic feature to obtain semantic feature loss information, and calculating a quantization loss based on the training semantic feature to obtain semantic quantization loss information includes the following steps.

Step 1102: Calculate a third similar distance between a training semantic feature corresponding to a first positive sample in each sample triple and a training semantic feature corresponding to a second positive sample in each sample triple, and calculate a fourth similar distance between the training semantic feature corresponding to the first positive sample in each sample triple and a training semantic feature corresponding to the negative sample in each sample triple.

The third similar distance is used for characterizing a similar distance between the training semantic features of the positive samples in the sample triplets. The fourth similar distance is used for characterizing a similar distance between the training semantic feature of the positive sample and the training semantic feature of the negative sample in the sample triple.

Specifically, when obtaining the training sample, the server directly obtains the training sample in the form of triple, that is, obtains a batch of samples, that is, the sample triple. Then, when calculating the triple loss of the feature, the triple loss corresponding to the sample triple can be directly calculated. That is, the server can use the Euclidean distance algorithm to calculate the third similar distance between the training semantic feature corresponding to the first positive sample and the training semantic feature corresponding to the second positive sample in the sample triple, and use the Euclidean distance algorithm to calculate the fourth similar distance between the training semantic feature corresponding to the first positive sample in the sample triple and the training semantic feature of the negative sample corresponding to the first positive sample.

Step 1104: Calculate an error between the third similar distance and the fourth similar distance to obtain triple semantic loss information corresponding to each sample triple, and perform averaging based on the triple semantic loss information corresponding to each sample triple to obtain the semantic feature loss information.

The triple global loss information refers to the loss information of the global feature calculated by the sample triple. Each sample triplet has corresponding triple global loss information.

Specifically, the server calculates the error between the third similar distance and the fourth similar distance, and then performs the average calculation to obtain the semantic feature loss information, which can cause the obtained semantic feature loss information more accurate, thereby improving the accuracy of the training.

Step 1106: Perform symbol quantization on the training semantic feature corresponding to each sample in the training sample to obtain a semantic quantization feature, calculate the error between the training semantic feature and the semantic quantization feature to obtain initial semantic quantization loss information corresponding to each sample in the training sample, and perform averaging based on the initial semantic quantization loss information corresponding to each sample in the training sample, to obtain the semantic quantization loss information.

The semantic quantization feature refers to the quantized feature obtained after the symbolic quantization of the training semantic feature. The initial semantic quantization loss information refers to the quantization loss corresponding to the training semantic feature, and each training semantic feature has the corresponding initial semantic quantization loss information.

Specifically, when calculating the quantization loss, the server first performs the symbolic quantization on the training semantic feature, where the symbol function sign can be used for the symbolic quantization to obtain the semantic quantization feature. Then, a regression loss can be used for computing the error between the training semantic feature and the semantic quantization feature, so as to obtain the initial semantic quantization loss information corresponding to each sample, and then perform the average calculation to obtain the semantic quantization loss information. Reverse iterative updating is performed by using the semantic quantization loss information, which can make each bit of the semantic feature outputted by the trained target fused feature model close to the quantization value, for example, close to 1 or −1, and improves the accuracy of the target fused feature model for the feature fusion.

In an embodiment, the training sample includes each sample triplet. As shown in FIG. 12, step 706 of calculating the triple loss based on the fused training feature to obtain fused feature loss information, and calculating the quantization loss based on the fused training feature to obtain fusion quantization loss information include:

Step 1202: Calculate a fifth similar distance between a fused training feature corresponding to a first positive sample in each of the sample triples and a fused training feature corresponding to a second positive sample in each sample triple, and calculate a sixth similar distance between the fused training feature corresponding to the first positive sample in each sample triple and a fused training feature corresponding to the negative sample in each sample triple.

The third similar distance is used for characterizing a similar distance between the fused training features of the positive sample in the sample triplet. The fourth similar distance is used for characterizing a similar distance between the fused training feature of the positive sample and the fused training feature of the negative sample in the sample triple.

Specifically, the server uses the Euclidean distance algorithm to calculate the distance between the positive sample fused training features in the sample triple to obtain the fifth similar distance, and simultaneously uses the Euclidean distance algorithm to calculate the distance between the positive and negative samples in the sample triple and the fused training feature to obtain the sixth similar distance.

Step 1204: Calculate an error between the fifth similar distance and the sixth similar distance to obtain triple fusion loss information corresponding to each sample triple, and perform averaging based on the triple fusion loss information corresponding to each sample triple to obtain the fused feature loss information.

The triple fusion loss information refers to the loss information of the fused feature calculated by the sample triple. Each sample triplet has a corresponding triplet fusion loss information.

Specifically, the server calculates the error between the fifth similar distance and the sixth similar distance, and then performs averaging to obtain the fused feature loss information, which can cause the obtained fused feature loss information more accurate, thereby improving the accuracy of the training.

Step 1206: Perform symbol quantization on the fused training feature corresponding to each sample in the training sample to obtain a fusion quantization feature, calculate the error between the fused training feature and the fusion quantization feature to obtain initial fusion quantization loss information corresponding to each sample in the training sample, and perform averaging based on the initial fusion quantization loss information corresponding to each sample in the training sample, to obtain the fusion quantization loss information.

The fusion quantization feature refers to the quantization feature obtained after the fusion quantization of the fused training feature. The initial fusion quantization loss information refers to the quantization loss corresponding to the fused training feature, and each fused training feature has the corresponding initial fusion quantization loss information.

Specifically, the server first performs symbol quantization on the fused training feature when calculating the quantitative loss of the fused training feature. The symbol quantization may be performed by using a symbol function sign to obtain a fusion quantization feature. Then, the error between the fused training feature and the fusion quantization feature may be calculated by using a regression loss, so as to obtain initial fusion quantization loss information corresponding to each sample, and then the averaging is performed to obtain fusion quantization loss information. Reverse iterative updating is performed by using the fusion quantization loss information, so that each bit of the fused feature outputted by the trained target fused feature model is close to the quantized value, for example, close to 1 or −1, thereby improving the accuracy of performing feature fusion by the target fused feature model.

In a specific embodiment, the server calculates the triple loss by using Equation (1) shown below.

$$l_{tri} = \max(\|x_a - x_p\| - \|x_a - x_n\| + \alpha, 0) \qquad \text{Equation (1)}$$

(a, p, n) is a triple sample, and $l_{tri}$ is the triple global loss information. a is the first positive sample, p is the second positive sample, and n is the negative sample. $X_a$ represents a feature corresponding to the first positive sample, the feature may be the initial global feature or the initial semantic feature or the fused training feature, $X_p$ represents a feature corresponding to the second positive sample, $X_n$ represents a feature corresponding to the negative sample, and $\alpha$ is a hyperparameter used for controlling a spatial distance between the positive sample and the negative sample, which may be set as needed. For example, the global feature and the semantic feature may be set to 56 during the loss calculation, and the fused feature may be set to 80 during the loss calculation. The training object of the triple loss information is to cause the distance between the first positive sample and the second positive sample to be greater than the value of the hyperparameter between the first positive sample and the negative sample.

In an embodiment, step 208 of performing category loss calculation based on an initial training category and a training sample category label to obtain an initial category loss includes:

calculating classification loss information between the initial training category corresponding to each of the training sample and the training sample category label to obtain a training category loss corresponding to each sample; and performing averaging based on the training category loss corresponding to each sample to obtain the initial category loss corresponding to the training sample.

Specifically, the server may calculate the classification loss by using a cross-entropy loss function, calculate the loss between the initial training category and the training sample category label corresponding to each sample, then perform averaging to obtain the initial category loss, thereby improving the accuracy of the obtained initial category loss, and then perform reverse iterative updating by using the initial category loss, thereby improving the accuracy of model training.

In a specific embodiment, the classification loss information may be calculated by using Equation (2) shown below.

$$L = \frac{1}{N} \sum_i L_i = \frac{1}{N} \sum_i -\sum_{c=1}^{M} y_{ic} \log(p_{ic}) \qquad \text{Equation (2)}$$

N is a quantity of samples. $p_{ic}$ represents a prediction probability that a sample i belongs to a category c, and $y_{ic}$ represents whether the training category label of the sample i is c. When the training category label is c, $y_{ic}=1$, or otherwise $y_{ic}$ is equal to 0.

In a specific embodiment, a total loss during the training may be calculated by using Equation (3) shown below, and then the reverse iterative updating is performed on the initial feature fusion model by using the total loss.

$$L_{total} = w_1 \sum_{j=1}^{Ntriplet} L_{hash-triplet1}[j] + w_2 \sum_{K=1}^{Nimage} L_{coding1}[k] + \qquad \text{Equation (3)}$$

$$w_3 \sum_{j=1}^{Ntriplet} L_{hash-triplet2}[j] + w_4 \sum_{K=1}^{Nimage} L_{coding2}[k] +$$

$$w_5 \sum_{K=1}^{Nimage} L_{class}[k] + w_6 \sum_{j=1}^{Ntriplet} L_{hash-triplet3}[j] + w_7 \sum_{K=1}^{Nimage} L_{coding3}[k]$$

of $L_{total}$ represents the total loss. Ntriplet represents a total number of sample triples, and Nimage represents the total number of samples. $L_{hash-triplet1}$ represents the triple loss of the global feature, and $L_{coding1}$ represents the quantitative loss of the global feature. $L_{hash-triplet2}$ represents the triple loss of the semantic feature, and $L_{coding2}$ represents the quantitative loss of the semantic feature. $L_{hash-triplet3}$ represents the triple loss of the fused feature, and $L_{coding3}$ represents the quantitative loss of the fused feature. $L_{class}$ represents the classification loss. W represents a preset weight, and different losses have different weights. For example, the weights may be set to w1=w3=w5=1, w2=w4=0.01, w6=1, and w7=0.01.

In a specific embodiment, a total pre-training loss during the pre-training may be calculated by using Equation (4) below, and then reverse iterative updating is performed on the pre-training model by using the total pre-training loss.

$$L_{total1} = w_1 \sum_{j=1}^{Ntriplet} L_{hash-triplet1}[j] + w_2 \sum_{K=1}^{Nimag} L_{coding1}[k] + \qquad \text{Equation (4)}$$

$$w_3 \sum_{j=1}^{Ntriplet} L_{hash-triplet2}[j] + w_4 \sum_{K=1}^{Nimage} L_{coding2}[k] + w_5 \sum_{K=1}^{Nimage} L_{class}[k]$$

$L_{total1}$ represents the total pre-training loss, which is the loss during the training in a first stage.

In an embodiment, as shown in FIG. 13, after step 210, that is, after updating the initial feature fusion model based on the initial feature loss and the initial category loss, return the acquired training sample and the corresponding training sample category label, and iteratively perform the operation of inputting the training sample into the initial feature fusion model until a target fusion model is obtained when a training completion condition is satisfied, the method further the following steps:

Step 1302: Acquire the input data;

Step 1304: the input data into the target fusion model, extract features of the input data through the target fusion model to obtain an input semantic feature and an input global feature, splice the input semantic feature and the input global feature to obtain a spliced input feature, perform autocorrelation feature calculation based on the spliced input feature to obtain an input autocorrelation feature, perform self-attention weight calculation based on the input autocorrelation feature to obtain an input self-attention weight, and adjust the spliced input feature through the input self-attention weight to obtain the target fused feature corresponding to the input data; and Step 1306: Use the target fused feature as an index corresponding to the input data.

The input data refers to the sample inputted by the target fusion model when being deployed and used. The target fused feature refers to the fused feature extracted from the input data.

Specifically, when the server is trained to obtain the target fusion model, the server can be deployed and used. When the server is used, the input data can be acquired from the database, the input data uploaded by the terminal can be acquired, and the input data transmitted by the business side can also be acquired. Then, the input data is inputted into the target fusion model for the extraction of the fused feature, and the target fused feature corresponding to the output input data is obtained. Then, the obtained target fused feature can be used as the index corresponding to the input data, so that the obtained index can be made more accurate. Then, the index can be stored in association with the corresponding input data to facilitate a subsequent use, and then when performing the sample retrieval, the index can be used for a similar sample detection, which can improve the efficiency and accuracy.

In an embodiment, the target fusion model includes a semantic feature extraction network, a global feature extraction network, a self-attention network, and a feature crossing network.

As shown in FIG. 14, step 1304 of inputting the input data into the target fusion model, extracting features of the input data through the target fusion model to obtain an input semantic feature and an input global feature, splicing the input semantic feature and the input global feature to obtain a spliced input feature, performing autocorrelation feature calculation based on the spliced input feature to obtain an input autocorrelation feature, performing self-attention weight calculation based on the input autocorrelation feature to obtain an input self-attention weight, and adjusting the spliced input feature through the input self-attention weight to obtain the target fused feature corresponding to the input data includes:

Step 1402: Respectively input the input data into the semantic feature extraction network and the global feature extraction network in the target fusion model to obtain the input semantic feature and the input global feature.

Step 1404: Splice the input semantic feature and the input global feature to obtain a spliced input feature, input the spliced input feature into the self-attention network, perform autocorrelation feature calculation based on the spliced input feature to obtain an input autocorrelation feature, perform self-attention weight calculation based on the input autocorrelation feature to obtain an input self-attention weight, and adjust the spliced input feature through the input self-attention weight to obtain the input adjustment feature corresponding to the input data.

Step 1406: Input the input adjustment feature into the feature crossing network for feature crossing to obtain the target fused feature corresponding to the input data.

Specifically, the target fusion model includes a semantic feature extraction network, a global feature extraction network, a self-attention network, and a feature crossing network. The target fusion model does not include the classification network used during the training. When the target fusion model is fused for the feature extraction, the semantic feature extraction network and the global feature extraction network are used for the feature extraction. Then, the feature fusion is performed through the self-attention network and the feature crossing network to obtain the output target fused feature. Then, the target fused feature is used as the corresponding index of the input data, thereby improving the accuracy of the obtained target fused feature and causing the index corresponding to the input data more accurate. Moreover, the target fused feature is used as the corresponding index of the input data can reduce the consumption of the storage resource and improve the retrieval efficiency.

In an embodiment, as shown in FIG. 15, a sample retrieval method is provided. Taking the method applied to the server in FIG. 1 as an example for description. It may be understood that the method can also be applied to a terminal and to a system that includes a terminal and a server and is implemented through the interaction of the terminal and the server. This embodiment includes the following steps:

Step 1502: Acquire a fused query feature corresponding to a query sample, the fused query feature being obtained by performing feature fusion and extraction by inputting the query sample into a target fusion model.

Step 1504: Extract features of the query sample through the target fusion model to obtain a query semantic feature and a query global feature, splice the query semantic feature and the query global feature to obtain a spliced query feature, perform autocorrelation feature calculation based on the spliced query feature to obtain a query autocorrelation feature, perform self-attention weight calculation based on the query autocorrelation feature to obtain a query self-attention weight, and adjust the spliced query feature through the query self-attention weight to obtain the fused query feature.

The query sample refers to the original sample used when a similar search is required, that is, a sample similar to the query sample is to be retrieved. The target fusion model may be obtained through training by using any one of the foregoing embodiments of the feature fusion model training method. The fused query feature refers to the query sample obtained by the extraction of the fused feature through the feature fusion model.

Specifically, the server can obtain the query sample from the database, then call the feature fusion model, input the query sample into the target fusion model for the feature extraction, and obtain the outputted fused query feature. The query sample may be an image, a text, a video, an audio, and the like.

Step 1506: Perform sample retrieval based on the fused query feature to obtain a target retrieval sample corresponding to the query sample.

Specifically, the server can use the fused query feature to calculate the similarity with the fused feature of each sample to be retrieved stored in the database to obtain each similarity. Then, according to the similarity, the to-be-retrieved sample with the most similarity is screened from the to-beretrieved sample as the target retrieval sample, and the to-be-retrieved sample in the front row with the highest similarity ranking can also be selected as the target retrieval sample.

In an embodiment, the fused feature extracted by the target fusion model is a hash feature. In this case, the efficiency of the retrieval can be improved by using the fused query feature to calculate the similarity with the fused feature of the to-be-retrieved sample and to obtain the target retrieval sample.

The above sample retrieval method uses the fused query feature to perform the sample retrieval. Since the fused query feature is extracted based on the query sample by using the target fusion model, the query semantic feature and the query global feature are obtained. The spliced query feature is obtained by splicing the query semantic feature and the query global feature. The autocorrelation feature calculation is performed based on the spliced query feature, to obtain the query autocorrelation feature. The self-attention weight calculation is performed based on the query autocorrelation feature, to obtain the query self-attention weight. The spliced query feature is adjusted through the query self-attention weight, to obtain a fused query feature. The query sample can be more accurately characterized, so that the obtained target retrieval sample can be made more accurate.

In a specific embodiment, FIG. 16 is a flowchart of a method for feature fusion model training. Specifically, Step 1602: Acquire a training sample and a corresponding training sample category label, and input the training sample into an initial feature fusion model.

Step 1604: Input the training sample into the initial basic feature extraction network through the initial feature fusion model, to obtain a first initial basic feature and a second initial basic feature, and input the first initial basic feature into the initial global feature extraction network for extraction of a global hash feature to obtain a training global feature.

Step 1606: Input the second initial basic feature into the initial semantic feature extraction network for extraction of a semantic hash feature through the initial feature fusion model, to obtain a training semantic feature, and input the training semantic feature into the initial classification network for classification and recognition to obtain an initial training category corresponding to the training sample.

Step 1608: Calculate a transpose of the spliced training feature through the initial feature fusion model to obtain a transposed feature, and multiply the transposed feature by the spliced training feature to obtain the autocorrelation feature; and performing mean pooling based on the autocorrelation feature to obtain a pooling feature.

Step 1610: Input the pooling feature into the initial self-attention network through the initial feature fusion model, the initial self-attention network acquiring a self-attention parameter; perform weighted calculation on the pooling feature based on the self-attention parameter to obtain the self-attention weight; and input the training adjustment feature into the initial feature crossing network for the feature crossing to obtain a fused training feature.

Step 1612: Calculate a triple loss based on the training global feature to obtain global feature loss information, and calculate a quantization loss based on the training global feature to obtain global quantization loss information; and calculate a triple loss based on the training semantic feature to obtain semantic feature loss information, and calculate a quantization loss based on the training semantic feature to obtain semantic quantization loss information.

Step 1614: Calculate the triple loss based on the fused training feature to obtain fused feature loss information, calculate the quantization loss based on the fused training feature to obtain fusion quantization loss information, and calculate a category loss based on the initial training category and the training sample category label to obtain an initial category loss.

Step 1616: Calculate, based on the global feature loss information, the global quantization loss information, the semantic feature loss information, the semantic quantization loss information, the fused feature loss information, the fusion quantization loss information, and the initial category loss, to obtain the total model loss.

Step 1618: Update the initial feature fusion model based on the total model loss, return the acquired training sample and the corresponding training sample category label, and iteratively perform the operation of inputting the training sample into the initial feature fusion model until a target fusion model is obtained when a training completion condition is satisfied.

Figure 17:
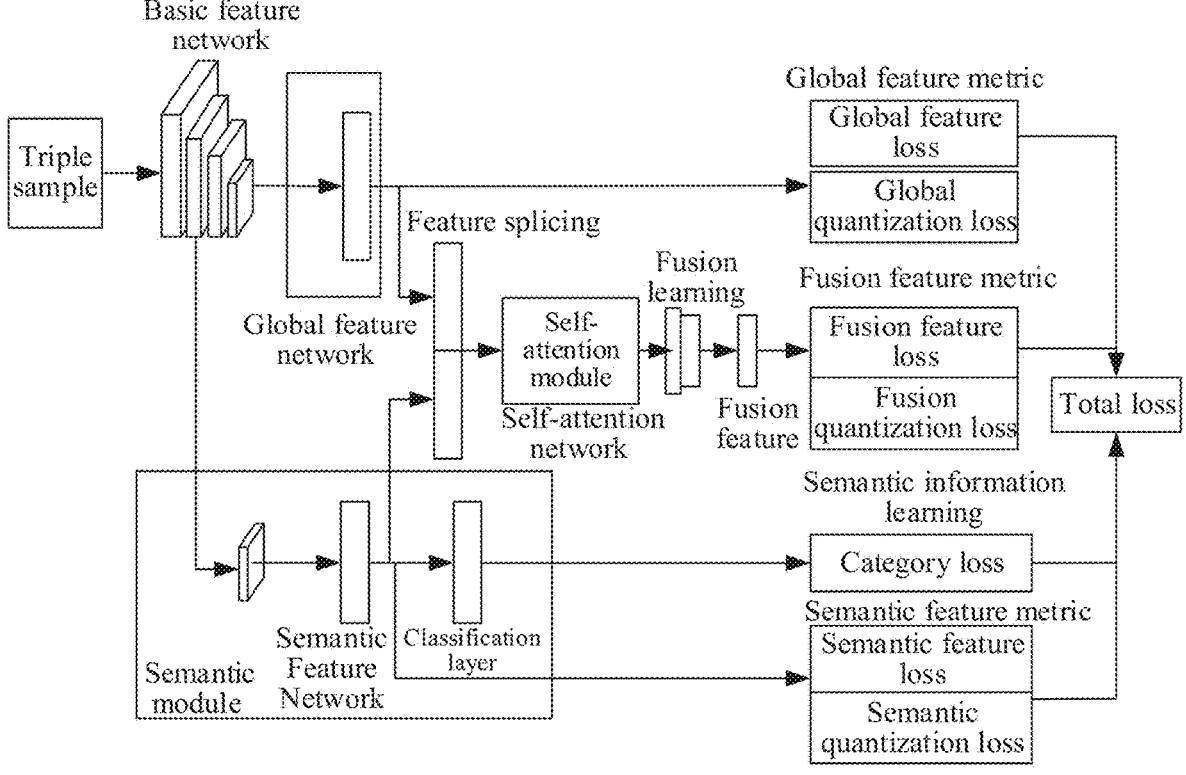
FIG. 17 is a schematic diagram of a training framework of a target fusion model according to an embodiment of the present disclosure.

In a specific embodiment, FIG. 17 is a schematic diagram of a training framework of a target fusion model. Specifically, The server obtains the full number of samples M, and then divides the full number of samples into different batches for training, and each batch has bs samples. If the samples are provided as a sample pair, the negative sample screening is performed to obtain the sample triple, and then all the sample triples of a batch are inputted into the feature fusion model to be trained. The parameters in the feature fusion model to be trained are initialized, including the networks of Table 1, Table 2, Table 3, Table 4, and Table 5. The network in Table 1 can be initialized by using the pre-training parameters, the conv6 parameters in Table 3 can be initialized by using the conv5 pre-training parameters in Table 1, and other networks can be initialized with a Gaussian distribution with a variance of 0.01 and a mean of 0. Then, the feature fusion model with the parameter initialization is trained. The feature fusion model extracts the basic feature from all samples through the basic feature network (such as the network in Table 1), and obtains the basic feature outputted by the last layer and the basic feature outputted by the last second layer. The feature fusion model uses the basic feature outputted by the last layer to perform the feature extraction through the global feature network (such as the network in Table 2) to obtain the training global feature. The feature fusion model uses the basic feature outputted by the last second layer to input into the semantic module (such as the network in Table 3), and performs the semantic feature extraction in the semantic feature network to obtain the training semantic feature, and then classifies the training semantic feature through the classification layer to obtain the initial classification result. Then, the training semantic feature and the training global feature are spliced to obtain the spliced training feature. The spliced training feature is inputted into the self-attention module for feature fusion through the self-attention network (such as the network in Table 4) to obtain the training adjustment feature. Then, the feature crossing is performed on the training adjustment feature through the fusion learning network (such as the network in Table 5) to obtain the fused training feature. Then, the loss calculation is performed, including a triadic loss, a quantization loss, and a categorical loss. The global feature loss, the global quantization loss, the fused feature loss, the fusion quantization loss, the category loss, the semantic feature loss, and the semantic quantization loss are calculated. Then, all losses are weighted and summed to obtain the final total model loss. Then, the updated feature fusion model is obtained by using the total model loss to update all parameters of the model through the layer descent algorithm. Then, the training sample of the next batch are inputted and continuously iterated until the training of all samples is completed and a round is completed. In this case, the training is performed again, and the preset number of times is reached, such as when K rounds of training or when the average loss of ten consecutive rounds does not drop, the training is completed and the target fusion model is obtained.

In a specific embodiment, the sample retrieval method is applicable to an image search platform. Specifically, The server obtains the query image uploaded by the terminal through the image search platform, and inputs the query image into the target fusion model. The target fusion model is configured to perform the feature extraction on the query image to obtain a query image semantic feature and a query image global feature, splice the query image semantic feature and the query image global feature to obtain a query image splicing feature, perform, based on the spliced training feature, an autocorrelation feature calculation to obtain an query image autocorrelation feature, perform, based on the query image autocorrelation feature, a self-attention weight calculation to obtain a query image self-attention weight, and adjust, through the query image self-attention weight, the query image splicing feature to obtain a fused query image feature corresponding to the query image sample.

Then, the server can use the fused query image feature to make a similar recall from an existing image database. That is to say, the fused feature similarity between the query image semantic feature or the query image global feature or the fused query image feature and the existing fused image feature in the image database is calculated, and the retrieved existing image is determined according to the similarity. The server can also use the query image semantic feature or the query image global feature to perform the image similarity recall from the existing image database. That is to say, the corresponding semantic feature similarity between the query image semantic feature and the existing image fused feature in the image database is calculated or the global feature similarity between the query image global feature and the existing image global feature in the image database is calculated. Then, the image similarity recall is performed from the existing image database according to the semantic feature similarity or the global feature similarity, and the retrieved existing images are obtained, and then the server returns the retrieved similar existing image to the terminal for display. By using the fused feature to search, the retrieval efficiency and accuracy can be improved, and the resource consumption of image index storage can be reduced.

In a specific embodiment, the sample retrieval method is applicable to Chinese or English search engines. Specifically, the user enters a search statement in a search page of the search engine, and then the search engine server obtains the search statement, and inputs the query image into the target fusion model for extraction of the fused feature, and obtains the fused search statement feature corresponding to the search statement. Then, the server uses the fused search statement feature to make a similar recall from the database. That is to say, the similarity between the fused search statement feature and the fused feature of the information stored in the database is calculated. The retrieved information is determined according to the similarity, and the link address of the information is obtained, and then the link address of the information is returned to the search page for display. The fused feature is used to search and recall, which can improve the search efficiency and accuracy, and reduce the consumption of the storage resource.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in the present disclosure, execution of the steps is not strictly limited, and the steps may be performed in other sequences. Moreover, at least some of the steps in each embodiment may include a plurality of steps or a plurality of stages. The steps or stages are not necessarily performed at the same moment but may be performed at different moments. Execution of the steps or stages is not necessarily sequentially performed, but may be performed alternately with other steps or at least some of steps or stages of other steps.

Based on the same inventive concept, the embodiments of the present disclosure further provide a feature fusion model training apparatus for realizing the feature fusion model training method and a sample retrieval apparatus for a sample retrieval method. The implementation provided by the apparatus to solve the problem is similar to the implementation described in the above method. Therefore, the specific limitations in the embodiments of one or more feature fusion model training apparatus or sample retrieval apparatus provided below can be referred to in the limitations for the feature fusion model training method or the sample retrieval method, which are not be repeated here.

Figure 18:
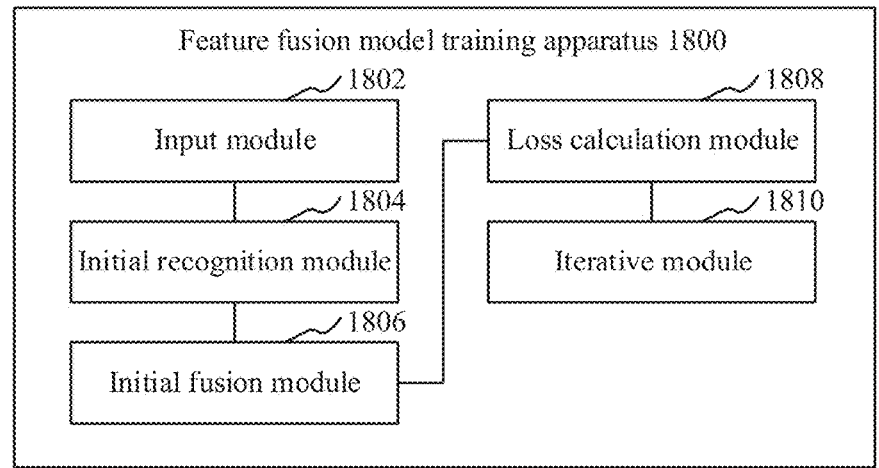
FIG. 18 is a structural block diagram of a feature fusion model training apparatus according to an embodiment of the present disclosure.

In an embodiment, as shown in FIG. 18, a feature fusion model training apparatus 1800 is provided including: an input module 1802, an initial recognition module 1804, an initial fusion module 1806, a loss calculation module 1808, and an iterative module 1810.

The input module 1802 is configured to acquire a training sample and a corresponding training sample category label, and input the training sample into an initial feature fusion model.

The initial recognition module 1804 is configured to extract a feature of the training sample through the initial feature fusion model to obtain a training semantic feature and a training global feature, and perform classification and recognition based on the training semantic feature to obtain an initial training category corresponding to the training sample.

The initial fusion module 1806 is configured to splice the training semantic feature and the training global feature through the initial feature fusion model to obtain a spliced training feature, calculate an autocorrelation feature based on the spliced training feature to obtain an autocorrelation feature, calculate a self-attention weight based on the auto-correlation feature to obtain a self-attention weight, and adjust the spliced training feature through the self-attention weight to obtain a fused training feature.

The loss calculation module 1808 is configured to calculate a feature loss based on the training global feature, the training semantic feature, and the fused training feature to obtain an initial feature loss, and calculate a category loss based on the initial training category and the training sample category label to obtain an initial category loss.

The iterative module 1810 is configured to update the initial feature fusion model based on the initial feature loss and the initial category loss, return the acquired training sample and the corresponding training sample category label, and iteratively perform the operation of inputting the training sample into the initial feature fusion model until a target fusion model is obtained when a training completion condition is satisfied, the target fusion model being configured to fuse the semantic feature and the global feature extracted from input data to obtain a target fused feature, and use the target fused feature as an index of the input data.

In an embodiment, the feature fusion model training apparatus 1800 further includes:

a pre-training module, configured to acquire a pre-training sample and a corresponding pre-training sample category label, input the pre-training sample into a pre-training model, extract features of the pre-training sample through the pre-training model to obtain a pre-training semantic feature and a pre-training global feature, and perform classification and recognition based on the pre-training semantic feature to obtain a pre-training category corresponding to the pre-training sample; calculate a feature loss based on the pre-training semantic feature and the pre-training global feature to obtain a pre-training feature loss, and calculate a category loss based on the pre-training category and the pre-training sample category label to obtain a pre-training category loss; update the pre-training model based on the pre-training feature loss and the pre-training category loss, return the acquired pre-training sample and the corresponding pre-training sample category label, and iteratively perform the operation of inputting the pre-training sample into the pre-training model until a target pre-training model is obtained when a pre-training completion condition is satisfied; and obtain the initial feature fusion model based on the target pre-training model.

In an embodiment, the initial feature fusion model includes an initial basic feature extraction network, an initial semantic feature extraction network, an initial global feature extraction network, and an initial classification network.

The initial recognition module 1804 is further configured to input the training sample into the initial basic feature extraction network to obtain a first initial basic feature and a second initial basic feature, a dimension of the first initial basic feature being smaller than a dimension of the second initial basic feature; input the first initial basic feature into the initial global feature extraction network for extraction of a global hash feature to obtain a training global feature; and input the second initial basic feature into the initial semantic feature extraction network for extraction of a semantic hash feature to obtain a training semantic feature, and input the training semantic feature into the initial classification network for classification and recognition to obtain an initial training category corresponding to the training sample.

In an embodiment, the initial fusion module 1806 is further configured to calculate a transpose of the spliced training feature to obtain a transposed feature, and multiply the transposed feature by the spliced training feature to obtain the autocorrelation feature; perform mean pooling based on the autocorrelation feature to obtain a pooling feature, acquire a self-attention parameter, and perform weighted calculation on the pooling feature based on the self-attention parameter to obtain a self-attention weight; and adjust the spliced training feature through the self-attention weight to obtain a training adjustment feature, and perform feature crossing based on the training adjustment feature to obtain the fused training feature.

In an embodiment, the initial feature fusion model includes an initial self-attention network and an initial feature crossing network.

The initial fusion module 1806 is further configured to input the pooling feature into the initial self-attention network, the initial self-attention network being configured to acquire a self-attention parameter, and perform weighted calculation on the pooling feature based on the self-attention parameter to obtain the self-attention weight; and input the training adjustment feature into the initial feature crossing network for the feature crossing to obtain a fused training feature.

In an exemplary embodiment, the loss calculation module 1808 includes:

a global loss calculation unit, configured to calculate a triple loss based on the training global feature to obtain global feature loss information, and calculate a quantization loss based on the training global feature to obtain global quantization loss information;

a semantic loss calculation unit, configured to calculate a triple loss based on the training semantic feature to obtain semantic feature loss information, and calculate a quantization loss based on the training semantic feature to obtain semantic quantization loss information;

a fusion loss calculation unit, configured to calculate the triple loss based on the fused training feature to obtain fused feature loss information, and calculate the quantization loss based on the fused training feature to obtain fusion quantization loss information; and a feature loss obtaining unit, configured to calculate, based on the global feature loss information, the global quantization loss information, the semantic feature loss information, the semantic quantization loss information, the fused feature loss information, and the fusion quantization loss information, to obtain the initial feature loss.

In an embodiment, the training sample includes positive sample pairs.

The global loss calculation unit is further configured to screen negative samples based on the positive sample pairs to obtain the negative samples corresponding to the positive sample pairs, and obtain sample triplets based on the positive sample pairs and the corresponding negative samples; calculate a first similar distance between a training global feature corresponding to a first positive sample in each sample triple and a training global feature corresponding to a second positive sample in each sample triple, and calculate a second similar distance between the training global feature corresponding to the first positive sample in each sample triple and a training global feature corresponding to the negative sample in each sample triple; calculate an error between the first similar distance and the second similar distance to obtain triple global loss information corresponding to each sample triple, and perform averaging based on the triple global loss information corresponding to each sample triple to obtain the global feature loss information; and perform symbol quantization on the training global feature corresponding to each of the training sample to obtain a global quantization feature, calculate the error between the training global feature and the global quantization feature to obtain initial global quantization loss information corresponding to each sample in the training sample, and perform averaging based on the initial global quantization loss information corresponding to each sample in the training sample, to obtain the global quantization loss information.

In an embodiment, the global loss calculation unit is further configured to determine current positive sample pairs and to-be-mined positive sample pairs based on the positive sample pairs; randomly select current positive samples from the current positive sample pairs, and randomly select to-bemined samples from the to-be-mined positive sample pairs to obtain each to-be-mined sample; calculate a similarity between each of the current positive samples and each of the to-be-mined samples, and determine a current negative sample corresponding to the current positive sample pair from the to-be-mined samples based on the similarity; and traverse the positive sample pairs to obtain negative samples corresponding to the positive sample pairs.

In an embodiment, the training sample includes sample triplets.

The semantic loss calculation unit is further configured to: calculate a third similar distance between a training semantic feature corresponding to a first positive sample in each sample triple and a training semantic feature corresponding to a second positive sample in each sample triple, and calculate a fourth similar distance between the training semantic feature corresponding to the first positive sample in each sample triple and a training semantic feature corresponding to the negative sample in each sample triple; calculate an error between the third similar distance and the fourth similar distance to obtain triple semantic loss information corresponding to each sample triple, and perform averaging based on the triple semantic loss information corresponding to each sample triple to obtain the semantic feature loss information; and perform symbol quantization on the training semantic feature corresponding to each sample in the training sample to obtain a semantic quantization feature, calculate the error between the training semantic feature and the semantic quantization feature to obtain initial semantic quantization loss information corresponding to each sample in the training sample, and perform averaging based on the initial semantic quantization loss information corresponding to each sample in the training sample, to obtain the semantic quantization loss information.

In an embodiment, the fusion loss calculation unit is configured to calculate a fifth similar distance between a fused training feature corresponding to a first positive sample in each of the sample triples and a fused training feature corresponding to a second positive sample in each sample triple, and calculate a sixth similar distance between the fused training feature corresponding to the first positive sample in each sample triple and a fused training feature corresponding to the negative sample in each sample triple; calculate an error between the fifth similar distance and the sixth similar distance to obtain triple fusion loss information corresponding to each sample triple, and perform averaging based on the triple fusion loss information corresponding to each sample triple to obtain the fused feature loss information; and perform symbol quantization on the fused training feature corresponding to each sample in the training sample to obtain a fusion quantization feature, calculate the error between the fused training feature and the fusion quantization feature to obtain initial fusion quantization loss information corresponding to each sample in the training sample, and perform averaging based on the initial fusion quantization loss information corresponding to each sample in the training sample, to obtain the fusion quantization loss information.

In an exemplary embodiment, the loss calculation module 1808 includes:

a category loss calculation unit, configured to calculate classification loss information between the initial training category corresponding to each sample in the training sample and the training sample category label to obtain a training category loss corresponding to each sample; and perform averaging based on the training category loss corresponding to each sample to obtain the initial category loss corresponding to the training sample.

In an embodiment, the feature fusion model training apparatus 1800 further includes:

a sample index building module, configured to: acquire the input data; input the input data into the target fusion model, extract features of the input data through the target fusion model to obtain an input semantic feature and an input global feature, splice the input semantic feature and the input global feature to obtain a spliced input feature, perform autocorrelation feature calculation based on the spliced input feature to obtain an input autocorrelation feature, perform self-attention weight calculation based on the input autocorrelation feature to obtain an input self-attention weight, and adjust the spliced input feature through the input self-attention weight to obtain the target fused feature corresponding to the input data; and use the target fused feature as an index corresponding to the input data.

In an embodiment, the target fusion model includes a semantic feature extraction network, a global feature extraction network, a self-attention network, and a feature crossing network.

The sample index building module is further configured to: respectively input the input data into the semantic feature extraction network and the global feature extraction network in the target fusion model to obtain the input semantic feature and the input global feature; splice the input semantic feature and the input global feature to obtain a spliced input feature, input the spliced input feature into the self-attention network, perform, by the self-attention network, autocorrelation feature calculation based on the spliced input feature to obtain an input autocorrelation feature, perform self-attention weight calculation based on the input autocorrelation feature to obtain an input self-attention weight, and adjust the spliced input feature through the input self-attention weight to obtain the input adjustment feature corresponding to the input data; and input the input adjustment feature into the feature crossing network for feature crossing to obtain the target fused feature and use the target fused feature as the index corresponding to the input data.

Figure 19:
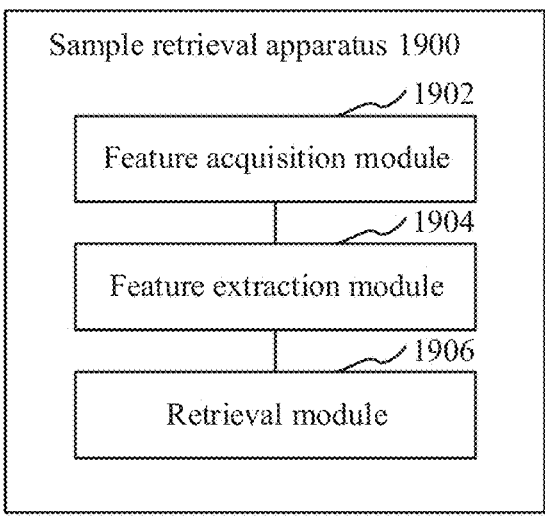
FIG. 19 is a block structural diagram of a sample retrieval apparatus according to an embodiment of the present disclosure.

In an embodiment, as shown in FIG. 19, a sample retrieval apparatus 1900 is provided, including: a feature acquisition module 1902, a feature extraction module 1904, and a retrieval module 1906.

The feature acquisition module 1902 is configured to acquire a fused query feature corresponding to a query sample, the fused query feature being obtained by performing feature fusion and extraction by inputting the query sample into a target fusion model.

The feature extraction module 1904 is configured to extract features of the query sample through the target fusion model to obtain a query semantic feature and a query global feature, splice the query semantic feature and the query global feature to obtain a spliced query feature, perform autocorrelation feature calculation based on the spliced query feature to obtain a query autocorrelation feature, perform self-attention weight calculation based on the query autocorrelation feature to obtain a query self-attention weight, and adjust the spliced query feature through the query self-attention weight to obtain the fused query feature.

The retrieval module 1906 is configured to perform sample retrieval based on the fused query feature to obtain a target retrieval sample corresponding to the query sample.

Each module in the sample retrieval apparatus or the feature fusion model training apparatus may be implemented entirely or partially by a software, a hardware, or a combination thereof. The foregoing modules may be built in or independent of a processor of a computer device in a form of hardware, or may be stored in a memory of the computer device in a form of software, so that the processor invokes and performs an operation corresponding to each of the foregoing modules.

In an embodiment, a computer device is provided. The computer device may be a server. An internal structure diagram of the server may be shown in FIG. 20. The computer device includes a processor, a memory, an input/output (I/O for short) interface, and a communication interface. The processor, the memory, and the I/O interface are connected through a system bus, and the communication interface is connected to the system bus through the I/O interface. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for execution of the operating system and the computer-readable instructions in the non-volatile storage medium. The database of the computer device is configured to store sample data, index data, and the like. The I/O interface of the computer device is configured to exchange information between the processor and the external device. The communication interface of the computer device is configured to connect and communicate with an external terminal through a network. The computer-readable instructions, when executed by the processor, implement a feature fusion model training method or a sample retrieval method.

In an embodiment, a computer device is provided. The computer device may be a terminal, and an internal structure diagram thereof may be shown in FIG. 21. The computer device includes a processor, a memory, a I/O interface, a communication interface, a display unit, and an input apparatus. The processor, the memory, and the I/O interface are connected through a system bus. The communication interface, the display unit, and the input apparatus are connected to the system bus through the I/O interface. The processor of the computer device is configured to provide computing and control capabilities. The memory of the computer device includes a non-volatile storage medium and an internal memory. The non-volatile storage medium stores an operating system and computer-readable instructions. The internal memory provides an environment for execution of the operating system and the computer-readable instructions in the non-volatile storage medium. The I/O interface of the computer device is configured to exchange information between the processor and the external device. The communication interface of the computer device is used for wired or wireless communication with an external terminal. The wireless communication may be realized by Wi-Fi, a mobile cellular network, near field communication (NFC), or other technologies. The computer-readable instructions, when executed by the processor, implement a feature fusion model training method or a retrieval method. The display unit of the computer device is configured to form a visually visible picture, which may be a display screen, a projection apparatus, or a virtual reality imaging apparatus. The display screen may be a liquid crystal display screen or an electronic ink display screen. The input apparatus of the computer device may be a touch layer covering the display screen, or may be a button, a trackball, or a touchpad disposed on a housing of the computer device, or may be an external keyboard, touchpad, a mouse, or the like.

Figure 20:
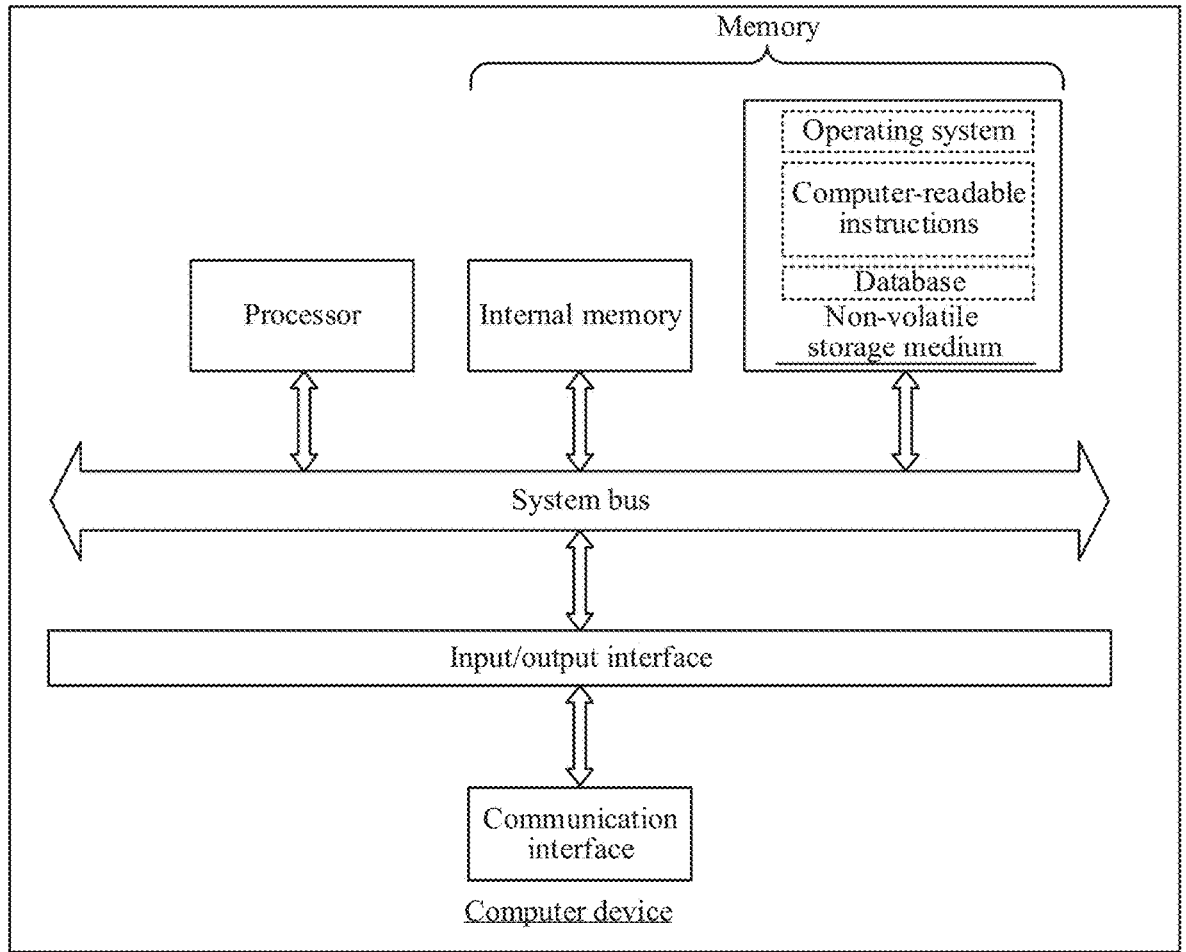
FIG. 20 is a diagram of an internal structure of a computer device according to an embodiment of the present disclosure.
Figure 21:
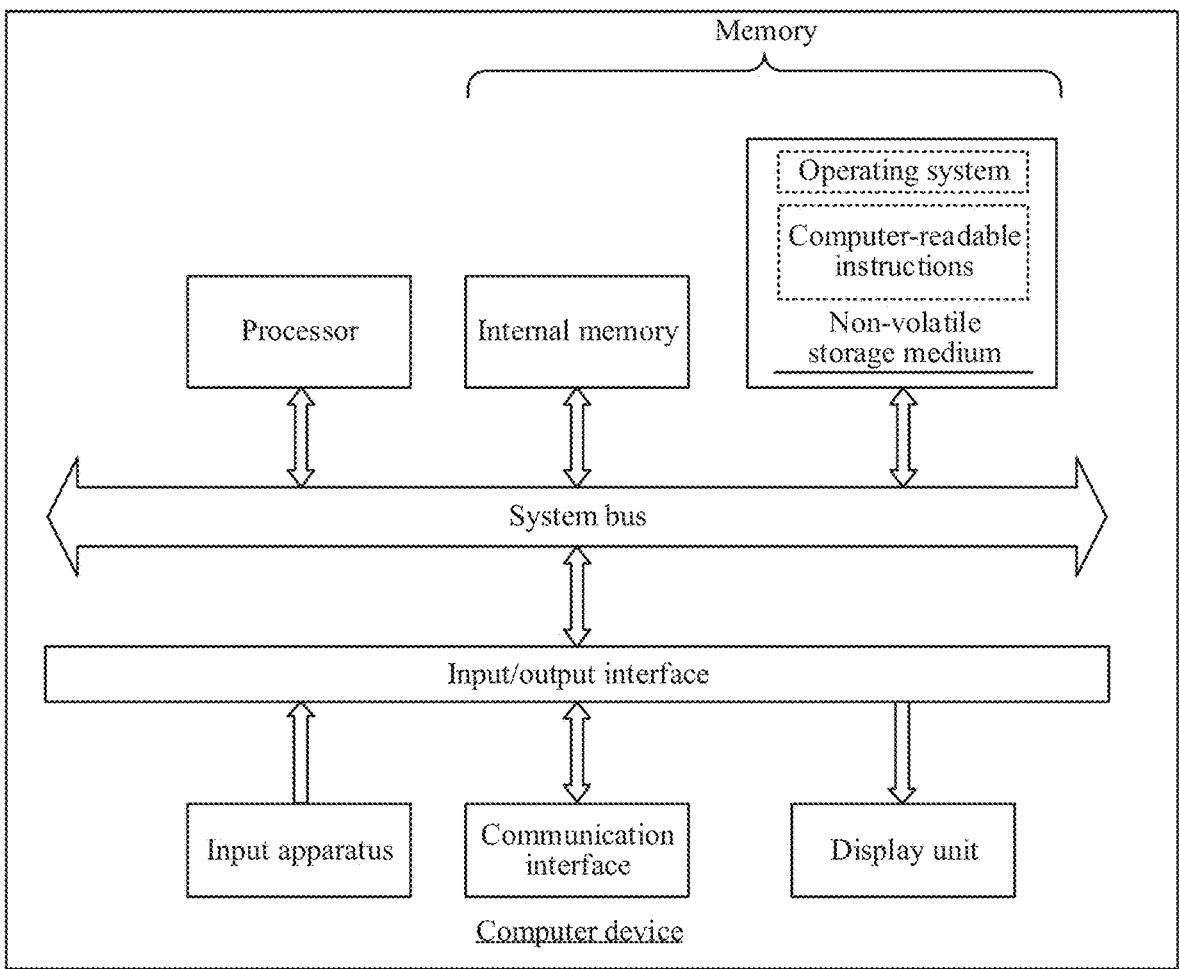
FIG. 21 is a diagram of an internal structure of a computer device according to an embodiment of the present disclosure.

A person skilled in the art may understand that, the structure shown in FIG. 20 or FIG. 21 is merely a block diagram of a partial structure related to a solution in the present disclosure, and does not constitute a limitation to the computer device to which the solution in the present disclosure is applied. Specifically, the computer device may include more or fewer components than those shown in the figure, or have some components combined, or have a different component deployment.

In an embodiment, a computer device is further provided, including a memory and a processor. The memory stores computer-readable instructions. The processor implements the operations in the foregoing method embodiments when executing the computer-readable instructions.

In an embodiment, a non-transitory computer-readable storage medium is provided, storing computer-readable instructions. The computer-readable instructions, when executed by a processor, implement the operations in the foregoing method embodiments.

In an embodiment, a computer program product is provided, including computer-readable instructions. The computer-readable instructions, when executed by the processor, the operations in the foregoing method embodiments are implemented.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

It is to be understood that the user information (including but not limited to user equipment information, user personal information, and so on) and data (including but not limited to data for analysis, stored data, displayed data, and so on) involved in the present disclosure are all authorized by the user or information and data fully authorized by all parties. The collection, use, and processing of relevant data require to comply with relevant laws, regulations, and standards of relevant countries and regions.

A person of ordinary skill in the art may understand that all or some of procedures of the method in the foregoing embodiments may be implemented by computer-readable instructions instructing relevant hardware. The computer-readable instructions may be stored in a non-volatile computer-readable storage medium. When the computer-readable instructions are executed, the procedures of the foregoing method embodiments may be implemented. Any reference to a memory, a database, or another medium used in the embodiments provided in the present disclosure may include at least one of a non-volatile memory and a volatile memory. The non-volatile memory may include a read-only memory (ROM) a magnetic tape, a floppy disk, a flash memory, an optical memory, a high density embedded non-volatile memory, a resistive memory (ReRAM), a magnetoresistive random access memory (MRAM), a magnetoresistive random access memory (FRAM), a phase change memory (PCM), a graphene memory, and the like. The non-volatile memory may include a random access memory (RAM) or an external cache memory. By way of description and not limitation, the RAM may be in various forms, such as a static random access memory (SRAM), a dynamic random access memory (DRAM), or the like. The databases involved in the embodiments provided in the present disclosure may include at least one of a relational database and a non-relational database. The non-relational database may include a distributed database based on a block chain, and so on, which is not limited thereto. The processor involved in the embodiments provided in the present disclosure may be a general purpose processor, a central processing unit, a graphics processing unit, a digital signal processor, a programmable logic device, a data processing logic device based on quantum computing, and the like, which is not limited thereto.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments show only several implementations of the present disclosure and are described in detail, which, however, are not to be construed as a limitation to the patent scope of the present disclosure. It is to be understood that for a person of ordinary skill in the art, several transformations and improvements can be made without departing from the idea of the present disclosure. These transformations and improvements belong to the protection scope of the present disclosure. Therefore, the protection scope of the present disclosure shall be subject to the appended claims.

What is claimed is:

1. A method for feature fusion model training, performed by a computer device, the method comprising:

acquiring a training sample and a corresponding training sample category label, and inputting the training sample into an initial feature fusion model;

extracting a feature of the training sample through the initial feature fusion model to obtain a training semantic feature and a training global feature, and performing classification and recognition based on the training semantic feature to obtain an initial training category corresponding to the training sample;

splicing the training semantic feature and the training global feature through the initial feature fusion model to obtain a spliced training feature, calculating an autocorrelation feature based on the spliced training feature to obtain an autocorrelation feature, calculating a self-attention weight based on the autocorrelation feature to obtain a self-attention weight, and adjusting the spliced training feature through the self-attention weight to obtain a fused training feature;

calculating a feature loss based on the training global feature, the training semantic feature, and the fused training feature to obtain an initial feature loss, and calculating a category loss based on the initial training category and the training sample category label to obtain an initial category loss; and updating the initial feature fusion model based on the initial feature loss and the initial category loss, returning the acquired training sample and the corresponding training sample category label, and iteratively performing the operation of inputting the training sample into the initial feature fusion model until a target fusion model is obtained when a training completion condition is satisfied, the target fusion model being configured to fuse the semantic feature and the global feature extracted from input data to obtain a target fused feature, and use the target fused feature as an index of the input data.

2. The method according to claim 1, further comprising:

acquiring a pre-training sample and a corresponding pre-training sample category label, inputting the pre-training sample into a pre-training model, extracting features of the pre-training sample through the pre-training model to obtain a pre-training semantic feature and a pre-training global feature, and performing classification and recognition based on the pre-training semantic feature to obtain a pre-training category corresponding to the pre-training sample;

calculating a feature loss based on the pre-training semantic feature and the pre-training global feature to obtain a pre-training feature loss, and calculating a category loss based on the pre-training category and the pre-training sample category label to obtain a pre-training category loss;

updating the pre-training model based on the pre-training feature loss and the pre-training category loss, returning the acquired pre-training sample and the corresponding pre-training sample category label, and iteratively performing the operation of inputting the pre-training sample into the pre-training model until a target pre-training model is obtained when a pre-training completion condition is satisfied; and obtaining the initial feature fusion model based on the target pre-training model.

3. The method according to claim 1, wherein the initial feature fusion model comprises an initial basic feature extraction network, an initial semantic feature extraction network, an initial global feature extraction network, and an initial classification network; and extracting the feature of the training sample to obtain the training semantic feature and the training global feature, and performing classification and recognition based on the training semantic feature to obtain the initial training category corresponding to the training sample comprises:

inputting the training sample into the initial basic feature extraction network to obtain a first initial basic feature and a second initial basic feature, the first initial basic feature and the second initial basic feature being features outputted by different network layers in the initial basic feature extraction network;

inputting the first initial basic feature into the initial global feature extraction network for extraction of a global hash feature to obtain a training global feature; and inputting the second initial basic feature into the initial semantic feature extraction network for extraction of a semantic hash feature to obtain a training semantic feature, and inputting the training semantic feature into the initial classification network for classification and recognition to obtain an initial training category corresponding to the training sample.

4. The method according to claim 1, wherein calculating the autocorrelation feature based on the spliced training feature to obtain the autocorrelation feature, calculating the self-attention weight based on the autocorrelation feature to obtain the self-attention weight, and adjusting the spliced training feature through the self-attention weight to obtain the fused training feature comprises:

calculating a transpose of the spliced training feature to obtain a transposed feature, and multiplying the transposed feature by the spliced training feature to obtain the autocorrelation feature;

performing mean pooling based on the autocorrelation feature to obtain a pooling feature, acquiring a self-attention parameter, and performing weighted calculation on the pooling feature based on the self-attention parameter to obtain a self-attention weight; and adjusting the spliced training feature through the self-attention weight to obtain a training adjustment feature, and performing feature crossing based on the training adjustment feature to obtain the fused training feature.

5. The method according to claim 4, wherein the initial feature fusion model comprises an initial self-attention network and an initial feature crossing network;

acquiring the self-attention parameter, and performing weighted calculation on the pooling feature based on the self-attention parameter to obtain the self-attention weight comprises:

inputting the pooling feature into the initial self-attention network, the initial self-attention network being configured to acquire a self-attention parameter, and perform weighted calculation on the pooling feature based on the self-attention parameter to obtain the self-attention weight; and performing the feature crossing based on the training adjustment feature to obtain the fused training feature comprises:

inputting the training adjustment feature into the initial feature crossing network for the feature crossing to obtain a fused training feature.

6. The method according to claim 1, wherein calculating the feature loss based on the training global feature, the training semantic feature, and the fused training feature to obtain the initial feature loss comprises:

calculating a triple loss based on the training global feature to obtain global feature loss information, and calculating a quantization loss based on the training global feature to obtain global quantization loss information;

calculating a triple loss based on the training semantic feature to obtain semantic feature loss information, and calculating a quantization loss based on the training semantic feature to obtain semantic quantization loss information;

calculating the triple loss based on the fused training feature to obtain fused feature loss information, and calculating the quantization loss based on the fused training feature to obtain fusion quantization loss information; and performing calculation based on the global feature loss information, the global quantization loss information, the semantic feature loss information, the semantic quantization loss information, the fused feature loss information, and the fusion quantization loss information, to obtain the initial feature loss.

7. The method according to claim 6, wherein the training sample comprises positive sample pairs; and calculating the triple loss based on the training global feature to obtain global feature loss information, and calculating the quantization loss based on the training global feature to obtain global quantization loss information comprises:

screening negative samples based on the positive sample pairs to obtain the negative samples corresponding to the positive sample pairs, and obtaining sample triplets based on the positive sample pairs and the corresponding negative samples;

calculating a first similar distance between a training global feature corresponding to a first positive sample in each of the sample triples and a training global feature corresponding to a second positive sample in each sample triple, and calculating a second similar distance between the training global feature corresponding to the first positive sample in each sample triple and the training global feature corresponding to the negative sample in each sample triple;

calculating an error between the first similar distance and the second similar distance to obtain triple global loss information corresponding to each sample triple, and performing averaging based on the triple global loss information corresponding to each sample triple to obtain the global feature loss information; and performing symbol quantization on the training global feature corresponding to each of the training sample to obtain a global quantization feature, calculating the error between the training global feature and the global quantization feature to obtain initial global quantization loss information corresponding to each sample in the training sample, and performing averaging based on the initial global quantization loss information corresponding to each sample in the training sample, to obtain the global quantization loss information.

8. The method according to claim 7, wherein screening negative samples based on the positive sample pairs to obtain the negative samples corresponding to the positive sample pairs comprises:

determining current positive sample pairs and to-be-mined positive sample pairs based on the positive sample pairs;

randomly selecting current positive samples from the current positive sample pairs, and randomly selecting to-be-mined samples from the to-be-mined positive sample pairs;

calculating a similarity between each of the current positive samples and each of the to-be-mined samples, and determining a current negative sample corresponding to the current positive sample pair from the to-be-mined samples based on the similarity; and traversing the positive sample pairs to obtain negative samples corresponding to the positive sample pairs.

9. The method according to claim 6, wherein the training sample comprises sample triplets; and calculating the triple loss based on the training semantic feature to obtain the semantic feature loss information, and calculating the quantization loss based on the training semantic feature to obtain the semantic quantization loss information comprises:

calculating a third similar distance between a training semantic feature corresponding to a first positive sample in each of the sample triples and a training semantic feature corresponding to a second positive sample in each sample triple, and calculating a fourth similar distance between the training semantic feature corresponding to the first positive sample in each sample triple and a training semantic feature corresponding to the negative sample in each sample triple;

calculating an error between the third similar distance and the fourth similar distance to obtain triple semantic loss information corresponding to each sample triple, and performing averaging based on the triple semantic loss information corresponding to each sample triple to obtain the semantic feature loss information; and performing symbol quantization on the training semantic feature corresponding to each sample in the training sample to obtain a semantic quantization feature, calculating the error between the training semantic feature and the semantic quantization feature to obtain initial semantic quantization loss information corresponding to each sample in the training sample, and performing averaging based on the initial semantic quantization loss information corresponding to each sample in the training sample, to obtain the semantic quantization loss information.

10. The method according to claim 6, wherein the training sample comprises sample triplets; and calculating the triple loss based on the fused training feature to obtain the fused feature loss information, and calculating the quantization loss based on the fused training feature to obtain the fusion quantization loss information comprises:

calculating a fifth similar distance between a fused training feature corresponding to a first positive sample in each of the sample triples and a fused training feature corresponding to a second positive sample in each sample triple, and calculating a sixth similar distance between the fused training feature corresponding to the first positive sample in each sample triple and a fused training feature corresponding to the negative sample in each sample triple;

calculating an error between the fifth similar distance and the sixth similar distance to obtain triple fusion loss information corresponding to each sample triple, and performing averaging based on the triple fusion loss information corresponding to each sample triple to obtain the fused feature loss information; and performing symbol quantization on the fused training feature corresponding to each sample in the training sample to obtain a fusion quantization feature, calculating the error between the fused training feature and the fusion quantization feature to obtain initial fusion quantization loss information corresponding to each sample in the training sample, and performing averaging based on the initial fusion quantization loss information corresponding to each sample in the training sample, to obtain the fusion quantization loss information.

11. The method according to claim 1, wherein calculating the category loss based on the initial training category and the training sample category label to obtain the initial category loss comprises:

calculating classification loss information between the initial training category corresponding to each sample in the training sample and the training sample category label to obtain a training category loss corresponding to each sample; and performing averaging based on the training category loss corresponding to each sample to obtain the initial category loss corresponding to the training sample.

12. The method according to claim 1, further comprising:

acquiring the input data;

inputting the input data into the target fusion model, extracting features of the input data through the target fusion model to obtain an input semantic feature and an input global feature, splicing the input semantic feature and the input global feature to obtain a spliced input feature, performing autocorrelation feature calculation based on the spliced input feature to obtain an input autocorrelation feature, performing self-attention weight calculation based on the input autocorrelation feature to obtain an input self-attention weight, and adjusting the spliced input feature through the input self-attention weight to obtain the target fused feature corresponding to the input data; and using the target fused feature as an index corresponding to the input data.

13. The method according to claim 12, wherein the target fusion model comprises a semantic feature extraction network, a global feature extraction network, a self-attention network, and a feature crossing network; and inputting the input data into the target fusion model, extracting features of the input data through the target fusion model to obtain the input semantic feature and the input global feature, splicing the input semantic feature and the input global feature to obtain the spliced input feature, performing the autocorrelation feature calculation based on the spliced input feature to obtain the input autocorrelation feature, performing the self-attention weight calculation based on the input autocorrelation feature to obtain the input self-attention weight, and adjusting the spliced input feature through the input self-attention weight to obtain the target fused feature corresponding to the input data comprises:

respectively inputting the input data into the semantic feature extraction network and the global feature extraction network in the target fusion model to obtain the input semantic feature and the input global feature;

splicing the input semantic feature and the input global feature to obtain the spliced input feature, and inputting the spliced input feature into the self-attention network, the self-attention network being configured to: perform autocorrelation feature calculation based on the spliced input feature to obtain an input autocorrelation feature, calculate a self-attention weight based on the input autocorrelation feature to obtain an input self-attention weight, and adjust the spliced input feature through the input self-attention weight to obtain an input adjustment feature corresponding to the input data; and inputting the input adjustment feature into the feature crossing network for feature crossing to obtain the target fused feature corresponding to the input data.

14. A computer device, comprising a memory and a processor, the memory storing computer-readable instructions, and the processor, when executing the computer-readable instructions, implementing a method for feature fusion model training, the method comprising:

acquiring a training sample and a corresponding training sample category label, and inputting the training sample into an initial feature fusion model;

extracting a feature of the training sample through the initial feature fusion model to obtain a training semantic feature and a training global feature, and performing classification and recognition based on the training semantic feature to obtain an initial training category corresponding to the training sample;

splicing the training semantic feature and the training global feature through the initial feature fusion model to obtain a spliced training feature, calculating an autocorrelation feature based on the spliced training feature to obtain an autocorrelation feature, calculating a self-attention weight based on the autocorrelation feature to obtain a self-attention weight, and adjusting the spliced training feature through the self-attention weight to obtain a fused training feature;

calculating a feature loss based on the training global feature, the training semantic feature, and the fused training feature to obtain an initial feature loss, and calculating a category loss based on the initial training category and the training sample category label to obtain an initial category loss; and updating the initial feature fusion model based on the initial feature loss and the initial category loss, returning the acquired training sample and the corresponding training sample category label, and iteratively performing the operation of inputting the training sample into the initial feature fusion model until a target fusion model is obtained when a training completion condition is satisfied, the target fusion model being configured to fuse the semantic feature and the global feature extracted from input data to obtain a target fused feature, and use the target fused feature as an index of the input data.

15. The computer device according to claim 14, wherein the method further comprises:

acquiring a pre-training sample and a corresponding pre-training sample category label, inputting the pre-training sample into a pre-training model, extracting features of the pre-training sample through the pre-training model to obtain a pre-training semantic feature and a pre-training global feature, and performing classification and recognition based on the pre-training semantic feature to obtain a pre-training category corresponding to the pre-training sample;

calculating a feature loss based on the pre-training semantic feature and the pre-training global feature to obtain a pre-training feature loss, and calculating a category loss based on the pre-training category and the pre-training sample category label to obtain a pre-training category loss;

updating the pre-training model based on the pre-training feature loss and the pre-training category loss, returning the acquired pre-training sample and the corresponding pre-training sample category label, and iteratively performing the operation of inputting the pre-training sample into the pre-training model until a target pre-training model is obtained when a pre-training completion condition is satisfied; and obtaining the initial feature fusion model based on the target pre-training model.

16. The computer device according to claim 14, wherein the initial feature fusion model comprises an initial basic feature extraction network, an initial semantic feature extraction network, an initial global feature extraction network, and an initial classification network; and extracting the feature of the training sample to obtain the training semantic feature and the training global feature, and performing classification and recognition based on the training semantic feature to obtain the initial training category corresponding to the training sample comprises:

inputting the training sample into the initial basic feature extraction network to obtain a first initial basic feature and a second initial basic feature, the first initial basic feature and the second initial basic feature being features outputted by different network layers in the initial basic feature extraction network;

inputting the first initial basic feature into the initial global feature extraction network for extraction of a global hash feature to obtain a training global feature; and inputting the second initial basic feature into the initial semantic feature extraction network for extraction of a semantic hash feature to obtain a training semantic feature, and inputting the training semantic feature into the initial classification network for classification and recognition to obtain an initial training category corresponding to the training sample.

17. The computer device according to claim 14, wherein calculating the autocorrelation feature based on the spliced training feature to obtain the autocorrelation feature, calculating the self-attention weight based on the autocorrelation feature to obtain the self-attention weight, and adjusting the spliced training feature through the self-attention weight to obtain the fused training feature comprises:

calculating a transpose of the spliced training feature to obtain a transposed feature, and multiplying the transposed feature by the spliced training feature to obtain the autocorrelation feature;

performing mean pooling based on the autocorrelation feature to obtain a pooling feature, acquiring a self-attention parameter, and performing weighted calculation on the pooling feature based on the self-attention parameter to obtain a self-attention weight; and adjusting the spliced training feature through the self-attention weight to obtain a training adjustment feature, and performing feature crossing based on the training adjustment feature to obtain the fused training feature.

18. The computer device according to claim 17, wherein the initial feature fusion model comprises an initial self-attention network and an initial feature crossing network;

acquiring the self-attention parameter, and performing weighted calculation on the pooling feature based on the self-attention parameter to obtain the self-attention weight comprises:

inputting the pooling feature into the initial self-attention network, the initial self-attention network being configured to acquire a self-attention parameter, and perform weighted calculation on the pooling feature based on the self-attention parameter to obtain the self-attention weight; and performing the feature crossing based on the training adjustment feature to obtain the fused training feature comprises:

inputting the training adjustment feature into the initial feature crossing network for the feature crossing to obtain a fused training feature.

19. The computer device according to claim 14, wherein calculating the feature loss based on the training global feature, the training semantic feature, and the fused training feature to obtain the initial feature loss comprises:

calculating a triple loss based on the training global feature to obtain global feature loss information, and calculating a quantization loss based on the training global feature to obtain global quantization loss information;

calculating a triple loss based on the training semantic feature to obtain semantic feature loss information, and calculating a quantization loss based on the training semantic feature to obtain semantic quantization loss information;

calculating the triple loss based on the fused training feature to obtain fused feature loss information, and calculating the quantization loss based on the fused training feature to obtain fusion quantization loss information; and performing calculation based on the global feature loss information, the global quantization loss information, the semantic feature loss information, the semantic quantization loss information, the fused feature loss information, and the fusion quantization loss information, to obtain the initial feature loss.

20. A non-transitory computer-readable storage medium, storing computer-readable instructions, the computer-readable instructions, when executed by a processor, implementing the operations of a method for feature fusion model training, the method comprising:

acquiring a training sample and a corresponding training sample category label, and inputting the training sample into an initial feature fusion model;

extracting a feature of the training sample through the initial feature fusion model to obtain a training semantic feature and a training global feature, and performing classification and recognition based on the training semantic feature to obtain an initial training category corresponding to the training sample;

splicing the training semantic feature and the training global feature through the initial feature fusion model to obtain a spliced training feature, calculating an autocorrelation feature based on the spliced training feature to obtain an autocorrelation feature, calculating a self-attention weight based on the autocorrelation feature to obtain a self-attention weight, and adjusting the spliced training feature through the self-attention weight to obtain a fused training feature;

calculating a feature loss based on the training global feature, the training semantic feature, and the fused training feature to obtain an initial feature loss, and calculating a category loss based on the initial training category and the training sample category label to obtain an initial category loss; and updating the initial feature fusion model based on the initial feature loss and the initial category loss, returning the acquired training sample and the corresponding training sample category label, and iteratively performing the operation of inputting the training sample into the initial feature fusion model until a target fusion model is obtained when a training completion condition is satisfied, the target fusion model being configured to fuse the semantic feature and the global feature extracted from input data to obtain a target fused feature, and use the target fused feature as an index of the input data.

\* \* \* \* \*